United States Patent
Kubota

(10) Patent No.: US 9,025,664 B2
(45) Date of Patent: May 5, 2015

(54) MOVING IMAGE ENCODING APPARATUS, MOVING IMAGE ENCODING METHOD, AND MOVING IMAGE ENCODING COMPUTER PROGRAM

(75) Inventor: Tomonori Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 600 days.

(21) Appl. No.: 13/206,023

(22) Filed: Aug. 9, 2011

(65) Prior Publication Data

US 2011/0292995 A1    Dec. 1, 2011

Related U.S. Application Data

(63) Continuation of application No. PCT/JP2009/053739, filed on Feb. 27, 2009.

(51) Int. Cl.
| | | |
|---|---|---|
| H04N 11/12 | (2006.01) | |
| H04N 21/234 | (2011.01) | |
| H04N 21/24 | (2011.01) | |
| H04N 21/258 | (2011.01) | |
| H04N 19/115 | (2014.01) | |

(Continued)

(52) U.S. Cl.
CPC .......... *H04N 21/23424* (2013.01); *G06F 5/065* (2013.01); *G06F 5/06* (2013.01); *H04N 21/23406* (2013.01); *H04N 21/2401* (2013.01); *H04N 21/25833* (2013.01); *H04N 19/115* (2013.01); *H04N 19/152* (2013.01); *H04N 19/177* (2013.01); *H04N 19/436* (2013.01)

(58) Field of Classification Search
CPC ..... H04N 7/465; H04N 7/5013; H04N 7/502; H04N 21/2401; H04N 21/23614; H04N 21/23406; G06F 5/06; G06F 5/065; G06F 7/78
See application file for complete search history.

(56) References Cited

U.S. PATENT DOCUMENTS 5,121,205 A * 6/1992 Ng et al. ........................ 348/568
5,617,118 A * 4/1997 Thompson .................... 345/558

(Continued)

FOREIGN PATENT DOCUMENTS

| CN | 1283045 A | 2/2001 |
|---|---|---|
| CN | 101330623 A | 12/2008 |

(Continued)

OTHER PUBLICATIONS

Office Action issued Jun. 19, 2013 in corresponding Chinese Application No. 200980156661.0.

(Continued)

*Primary Examiner* — Sath V Perungavoor
*Assistant Examiner* — Matthew J Anderson
(74) *Attorney, Agent, or Firm* — Staas & Halsey LLP

(57) ABSTRACT

A moving image encoding apparatus, which divides moving image data into a plurality of sub-data, encodes the sub-data in parallel by using a plurality of encoders, and thereafter splices the resulting encoded sub-bitstream data into a single bitstream, includes a convergence target deriving function for determining a target value for a first amount of buffer occupancy so that the first amount of buffer occupancy at a point in time at which data corresponding to a last picture contained in first sub-bitstream data is removed from a first hypothetical buffer does not drop below a second amount of buffer occupancy which represents the amount of space that second sub-bitstream data occupies in a second hypothetical buffer at that point in time.

10 Claims, 9 Drawing Sheets

(51) Int. Cl.
*H04N 19/152* (2014.01)
*H04N 19/177* (2014.01)
*H04N 19/436* (2014.01)
*G06F 5/06* (2006.01)

(56) References Cited

U.S. PATENT DOCUMENTS

| | | | | |
|---|---|---|---|---|
| 5,793,431 | A * | 8/1998 | Blanchard | 375/240.01 |
| 5,953,020 | A * | 9/1999 | Wang et al. | 345/558 |
| 6,345,122 | B1 * | 2/2002 | Yamato et al. | 382/232 |
| 6,418,474 | B1 * | 7/2002 | Morris | 709/233 |
| 6,532,242 | B1 * | 3/2003 | Tahara | 370/487 |
| 6,574,193 | B1 * | 6/2003 | Kinrot | 370/229 |
| 6,704,281 | B1 * | 3/2004 | Hourunranta et al. | 370/230 |
| 6,873,654 | B1 * | 3/2005 | Rackett | 375/240.03 |
| 7,394,851 | B2 * | 7/2008 | Kato et al. | 375/240.01 |
| 7,420,919 | B1 * | 9/2008 | Toudeh-Fallah et al. | 370/235 |
| 7,765,335 | B2 * | 7/2010 | Iima | 710/19 |
| 7,830,889 | B1 * | 11/2010 | Lemaire et al. | 370/395.4 |
| 7,937,735 | B2 * | 5/2011 | Avison | 725/90 |
| 8,249,433 | B2 * | 8/2012 | Tanaka | 386/344 |
| 8,306,110 | B2 * | 11/2012 | Togita | 375/240.03 |
| 8,315,313 | B2 * | 11/2012 | Suzuki | 375/240.26 |
| 8,477,843 | B2 * | 7/2013 | Nie et al. | 375/240.02 |
| 8,527,649 | B2 * | 9/2013 | Wexler et al. | 709/231 |
| 2001/0055972 | A1 * | 12/2001 | Sakata | 455/452 |
| 2002/0080875 | A1 * | 6/2002 | Tahara et al. | 375/240.02 |
| 2003/0067989 | A1 * | 4/2003 | Yoshinari | 375/240.25 |
| 2004/0264566 | A1 | 12/2004 | Kato et al. | |
| 2005/0259946 | A1 * | 11/2005 | Kitamura | 386/46 |
| 2006/0050778 | A1 | 3/2006 | Aridome et al. | |
| 2006/0265485 | A1 * | 11/2006 | Chai et al. | 709/223 |
| 2007/0058729 | A1 * | 3/2007 | Yoshinari | 375/240.25 |
| 2007/0116117 | A1 * | 5/2007 | Tong et al. | 375/240.08 |
| 2007/0159467 | A1 * | 7/2007 | Kim et al. | 345/173 |
| 2008/0056358 | A1 | 3/2008 | Fuchie et al. | |
| 2008/0059154 | A1 * | 3/2008 | Ramo et al. | 704/200.1 |
| 2008/0075164 | A1 | 3/2008 | Matsumura | |
| 2008/0085719 | A1 * | 4/2008 | Kuchibhotla et al. | 455/452.1 |
| 2008/0317139 | A1 * | 12/2008 | Arakawa | 375/240.28 |
| 2009/0086818 | A1 * | 4/2009 | Kim | 375/240.12 |
| 2009/0307368 | A1 * | 12/2009 | Sriram et al. | 709/231 |
| 2010/0020654 | A1 * | 1/2010 | Tsai et al. | 369/47.15 |
| 2010/0067879 | A1 * | 3/2010 | Togita | 386/98 |
| 2010/0074111 | A1 * | 3/2010 | Krishnaprasad et al. | 370/231 |

FOREIGN PATENT DOCUMENTS

| | | |
|---|---|---|
| JP | 2001-54118 | 2/2001 |
| JP | 2002-165214 | 6/2002 |
| JP | 2004-297829 | 10/2004 |
| JP | 2005-136633 | 5/2005 |
| JP | 2006-54529 | 2/2006 |
| JP | 2008-85673 | 4/2008 |
| JP | 2009-4897 | 1/2009 |
| WO | 96/17491 | 6/1996 |

OTHER PUBLICATIONS

International Search Report for PCT/JP2009/053739, mailed May 12, 2009.

Extended European Search Report dated Oct. 7, 2014 in corresponding European Patent Application No. 09840799.2.

* cited by examiner

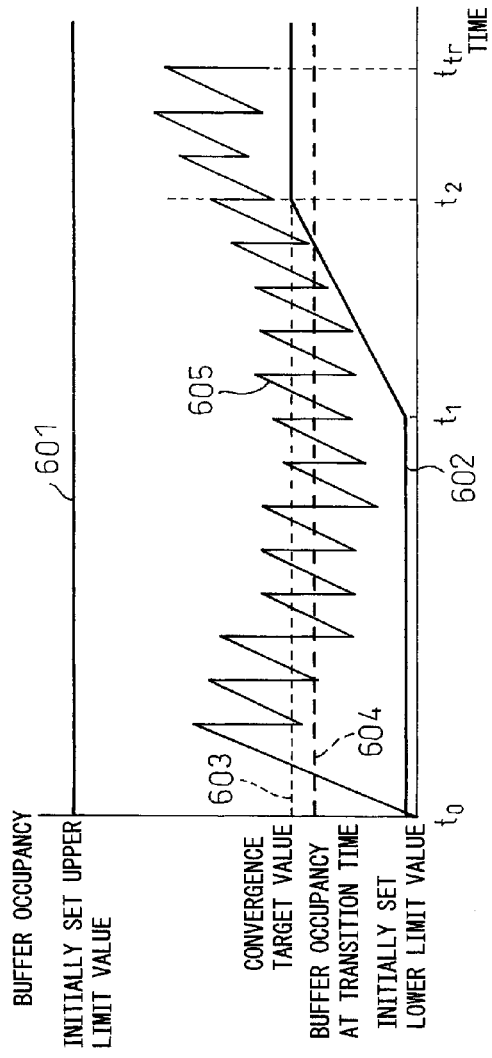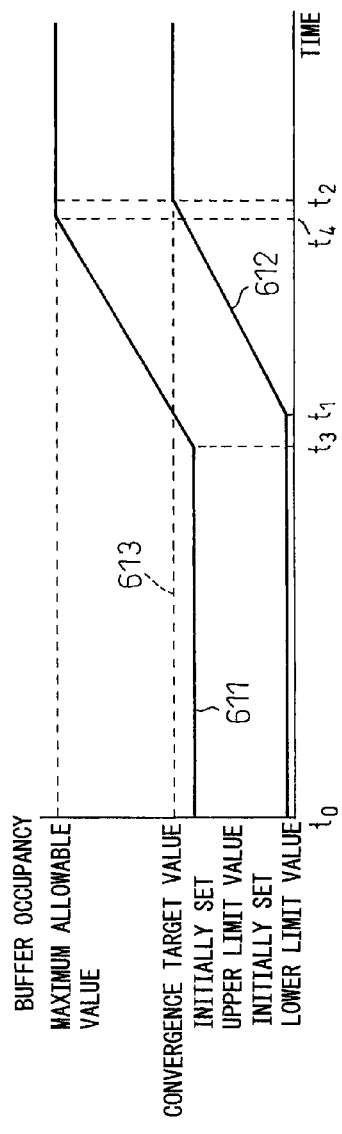

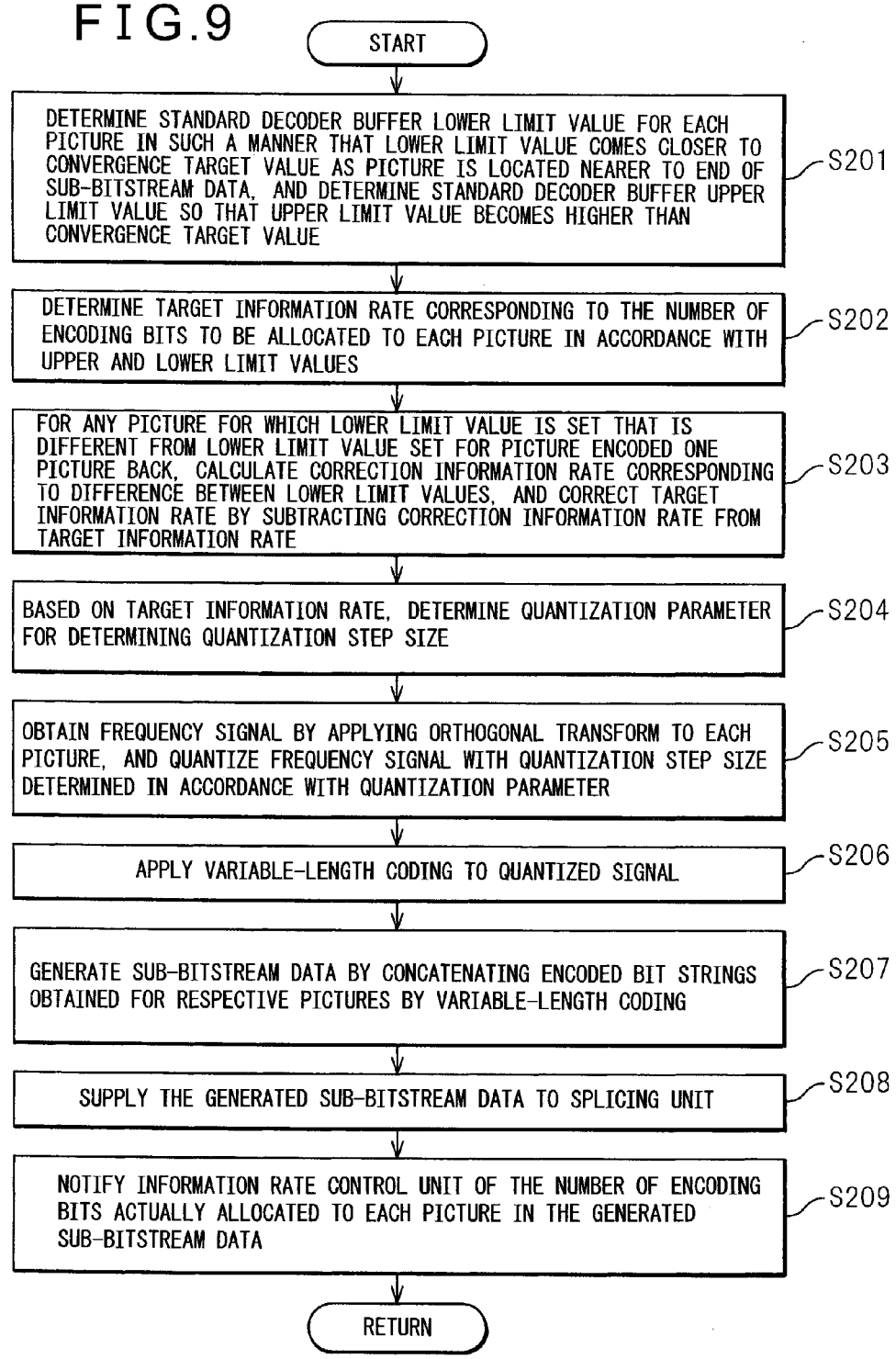

MOVING IMAGE ENCODING APPARATUS, MOVING IMAGE ENCODING METHOD, AND MOVING IMAGE ENCODING COMPUTER PROGRAM

CROSS-REFERENCE TO RELATED APPLICATION

This application is a continuation application and is based upon PCT/JP2009/53739, filed on Feb. 27, 2009, the entire contents of which are incorporated herein by reference.

FIELD

The embodiments disclosed herein are related to a moving image encoding apparatus, a moving image encoding method, and a moving image encoding computer program, wherein a plurality of data blocks into which moving image data has been divided are encoded in parallel, thereby generating, at high speed, bitstream data whose amount of data is smaller than that of the original moving image data.

BACKGROUND

Generally, the amount of moving image data is very large. Therefore, an apparatus that handles moving image data compresses the amount of data by encoding the moving image data, before transmitting the moving image data to other apparatus or storing the moving image data in a storage device. In particular, in order to encode such moving image data at high speed, there is proposed a moving image encoding apparatus which divides the moving image data into a plurality of sub-data, encodes the sub-data in parallel by using a plurality of encoders, and thereafter splices the encoded sub-data into single bitstream data.

When the encoded moving image data is transferred to a decoding apparatus, the decoding apparatus is expected to be able to decode the encoded moving image data. For that purpose, it is postulated that the decoding apparatus includes a buffer having a given capacity for temporarily storing the encoded moving image data. In this case, the moving image data encoding apparatus is requested to encode the moving image data so that the amount of data to be stored in the buffer will always fall within the limits of that capacity. This hypothetical buffer provided in the decoding apparatus will hereinafter be referred to as the standard decoder buffer. For example, in the Moving Picture Experts Group (MPEG), a concept referred to as the Video Buffering Verifier (VBV) is defined to address the variation in the amount of space that the encoded moving image data occupies in the standard decoder buffer. The VBV employs a model in which, after the encoded moving image data in an amount equal to the initial delay has been stored into the standard decoder buffer at the maximum transfer bit rate, data for one picture is removed instantaneously from the standard decoder buffer at predetermined intervals of time. Then, when the moving image data is encoded at a fixed bit rate, the amount of space that the encoded moving image data transferred into the standard decoder buffer occupies in the standard decoder buffer has to be held within the limits defined by the maximum and minimum allowable values of the standard decoder buffer.

However, when a plurality of moving image data blocks separately encoded are spliced together, the bitstream data produced by splicing the moving image data blocks may not satisfy the specification of the standard decoder buffer, though each individual moving image data block may satisfy the specification of the standard decoder buffer. This problem arises for the following reason. That is, it is defined that the bitstream data continue to be transferred into the standard decoder buffer at the maximum transfer bit rate until the transmission of the bitstream data is completed. However, depending on the timing at which two successively transmitted encoded moving image data blocks are spliced, there may arise inconsistency in motion between the amount of restoration of the buffer before the temporally succeeding encoded moving image data block is spliced and the amount of restoration of the buffer when the two encoded moving image data blocks are treated as a continuous moving image data block not divided at the splicing point. As a result, when the last picture in the temporally preceding encoded moving image data block among the two encoded moving image data blocks is decoded, the amount of space that the temporally succeeding encoded moving image data block occupies in the standard decoder buffer does not coincide with the amount of buffer space occupied by the bitstream data.

To address this problem, there is proposed a technique which encodes moving image data so as to satisfy the specification of the standard decoder buffer by calculating the amount of initial delay at each splicing point based on the result obtained by simulating the change in the amount of occupancy in the standard decoder buffer. There is also proposed a technique which, after decoding data contained in the splicing section of spliced MPEG image data, re-encodes the data contained in the splicing section in such a manner that the amount of occupancy in the standard decoder buffer falls within the limits defined by the maximum and minimum allowable values of the buffer.

Patent document 1: Japanese Unexamined Patent Publication No. 2008-85673
Patent document 2: Japanese Unexamined Patent Publication No. 2004-297829

SUMMARY

In the case of the technique that simulates the change in the amount of buffer occupancy, if the result of the simulation indicates that the encoded data does not satisfy the specification of the standard decoder buffer, the simulation has to be redone by adjusting the parameter used to determine the number of encoding bits to be allocated to each picture. As a result, in the moving image encoding apparatus using this technique, it may take a lot of time to encode the moving image data.

On the other hand, the technique that re-encodes the decoded data in the splicing section after once decoding the data requires an extra time to re-encode the decoded data. Furthermore, this technique does not adjust the amount of buffer when splicing the divided moving image data. As a result, if the splicing point is not set appropriately, the amount of encoding bits to be allocated to a particular picture may significantly decrease, resulting in a marked degradation of image quality.

According to one embodiment, there is provided a moving image encoding apparatus. The moving image encoding apparatus includes: a storage unit which stores moving image data which includes at least first sub-data and second sub-data each containing a plurality of pictures; a processing unit which, by encoding the moving image data, generates bitstream data whose amount of data is smaller than the amount of data of the moving image data; and an output unit which outputs the bitstream data. The processing unit implements: a convergence target deriving function which, on the assumption that the bitstream data is transferred to a hypothetical decoder at a prescribed transfer rate and stored into a buffer in the decoder and that data corresponding to the pictures contained in the bitstream data are sequentially removed from the buffer at predetermined intervals of time, determines a target value for a first amount of buffer occupancy so that the first amount of buffer occupancy, which represents the amount of space that the bitstream data occupies in the buffer at a first point in time at which data corresponding to a last picture contained in first sub-bitstream data generated by encoding the first sub-data is removed from the buffer, does not drop below a second amount of buffer occupancy which represents the amount of space that second sub-bitstream data generated by encoding the second sub-data occupies in the buffer at the first point in time; a first encoding function which determines the number of encoding bits to be allocated to each picture contained in the first sub-data so that the first amount of buffer occupancy becomes identical to the target value, and which generates the first sub-bitstream data by encoding the first sub-data in accordance with the allocated number of encoding bits; a second encoding function which generates the second sub-bitstream data by encoding the second sub-data; and a splicing function which generates the bitstream data by splicing the first sub-bitstream data and the second sub-bitstream data.

According to another embodiment, there is provided a moving image encoding method for encoding moving image data, which includes at least first sub-data and second sub-data each containing a plurality of pictures, and thereby generating bitstream data whose amount of data is smaller than the amount of data of the moving image data. The moving image encoding method includes: on the assumption that the bitstream data is transferred to a hypothetical decoder at a prescribed transfer rate and stored into a buffer in the decoder and that data corresponding to the pictures contained in the bitstream data are sequentially removed from the buffer at predetermined intervals of time, determining a target value for a first amount of buffer occupancy so that the first amount of buffer occupancy, which represents the amount of space that the bitstream data occupies in the buffer at a first point in time at which data corresponding to a last picture contained in first sub-bitstream data generated by encoding the first sub-data is removed from the buffer, does not drop below a second amount of buffer occupancy which represents the amount of space that second sub-bitstream data generated by encoding the second sub-data occupies in the buffer at the first point in time; determining the number of encoding bits to be allocated to each picture contained in the first sub-data so that the first amount of buffer occupancy becomes identical with the target value, and generating the first sub-bitstream data by encoding the first sub-data in accordance with the allocated number of encoding bits; generating the second sub-bitstream data by encoding the second sub-data; and generating the bitstream data by splicing the first sub-bitstream data and the second sub-bitstream data.

According to still another embodiment, there is provided a moving image encoding computer program for causing a computer to encode moving image data, which includes at least first sub-data and second sub-data each containing a plurality of pictures, and to thereby generate bitstream data whose amount of data is smaller than the amount of data of the moving image data. The computer program includes instructions for causing the computer to execute the steps of: on the assumption that the bitstream data is transferred to a hypothetical decoder at a prescribed transfer rate and stored into a buffer in the decoder and that data corresponding to the pictures contained in the bitstream data are sequentially removed from the buffer at predetermined intervals of time, determining a target value for a first amount of buffer occupancy so that the first amount of buffer occupancy, which represents the amount of space that the bitstream data occupies in the buffer at a first point in time at which data corresponding to a last picture contained in first sub-bitstream data generated by encoding the first sub-data is removed from the buffer, does not drop below a second amount of buffer occupancy which represents the amount of space that second sub-bitstream data generated by encoding the second sub-data occupies in the buffer at the first point in time; determining the number of encoding bits to be allocated to each picture contained in the first sub-data so that the first amount of buffer occupancy becomes identical with the target value, and generating the first sub-bitstream data by encoding the first sub-data in accordance with the allocated number of encoding bits; generating the second sub-bitstream data by encoding the second sub-data; and generating the bitstream data by splicing the first sub-bitstream data and the second sub-bitstream data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 6A is a graph illustrating one example of how a lower limit value that is set for the standard decoder buffer changes over time. FIG. 6B is a graph illustrating one example of how an upper limit value that is set for the standard decoder buffer changes over time.

FIG. 9 is an operation flowchart illustrating a sub-data encoding process which each encoding unit carries out under the control of the computer program executed on the processing unit in the moving image encoding apparatus.

DESCRIPTION OF EMBODIMENTS

A moving image encoding apparatus according to one embodiment will be described below with reference to the drawings.

The moving image encoding apparatus divides moving image data into a plurality of sub-data, generates sub-bitstream data by encoding the sub-data using respectively different encoders, and splices the thus generated sub-bitstream data into single bitstream data. In order to satisfy the specification of the standard decoder buffer, the moving image encoding apparatus controls the number of encoding bits to be allocated to the temporally preceding sub-bitstream data constituting the first of two sub-bitstream data to be spliced together. Further, the moving image encoding apparatus inserts, between the temporally preceding sub-bitstream data and the temporally succeeding sub-bitstream data, an invalid bit string that is extracted simultaneously when the last picture in the sub-bitstream data is decoded. By so doing, the moving image encoding apparatus eliminates any difference that may occur between the amount of space that the temporally succeeding sub-bitstream data occupies in the standard decoder buffer and the amount of space that the bitstream data occupies in the standard decoder buffer when the last picture contained in the temporally preceding sub-bitstream data is decoded.

The pictures contained in the moving image data to be encoded may be either fields obtained by interlaced scanning or frames obtained by progressive scanning.

Figure 1:
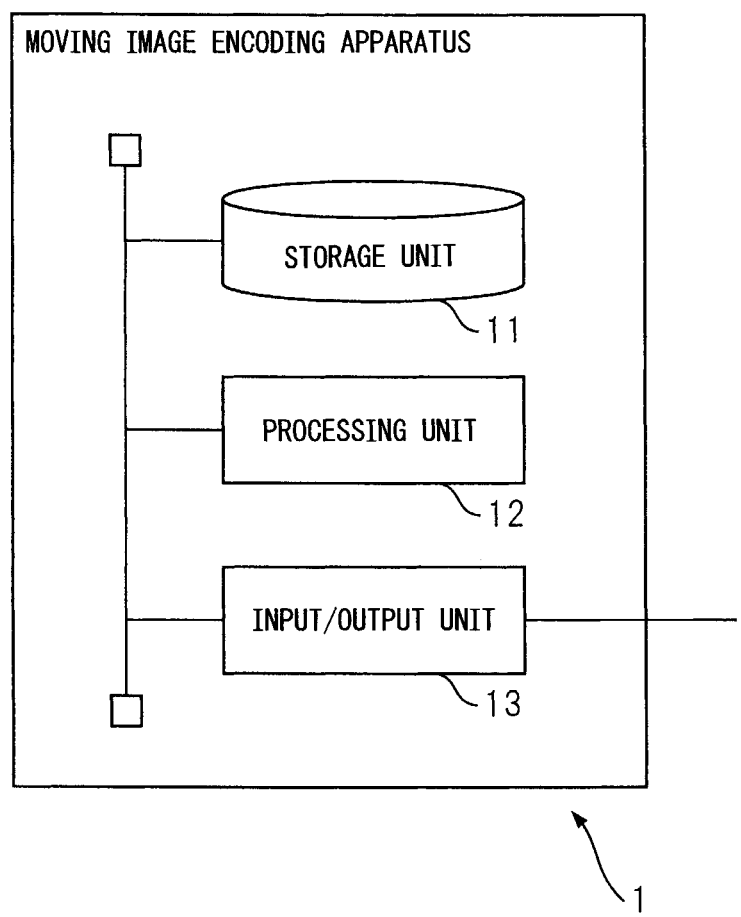
FIG. 1 is a diagram illustrating in simplified form the configuration of a moving image encoding apparatus according to one embodiment.

FIG. 1 is a diagram illustrating in simplified form the configuration of the moving image encoding apparatus 1 according to the one embodiment. As illustrated in FIG. 1, the moving image encoding apparatus 1 includes a storage unit 11, a processing unit 12, and an input/output unit 13.

The storage unit 11 includes at least one device selected from among, for example, a semiconductor memory device, a magnetic disk device, and an optical disk device. The storage unit 11 stores a computer program and various kinds of data used in the moving image encoding apparatus 1. The storage unit 11 also stores the moving image data to be encoded. The storage unit 11 may also store the bitstream data generated by encoding the moving image data by the processing unit 12.

The input/output unit 13 includes, for example, a communication interface for connecting the moving image encoding apparatus 1 to a communication network (not depicted), and a control circuit for the interface. Then, the input/output unit 13 transmits the bitstream data, generated by encoding the moving image data by the processing unit 12, to other apparatus via the communication network. The input/output unit 13 may obtain moving image data from other apparatus via the communication network and may pass the moving image data to the processing unit 12 for encoding.

The processing unit 12 includes one or a plurality of processors, a memory, and their peripheral circuitry. The processing unit 12 encodes the moving image data read out of the storage unit 11 or the moving image data obtained through the input/output unit 13.

Figure 2:
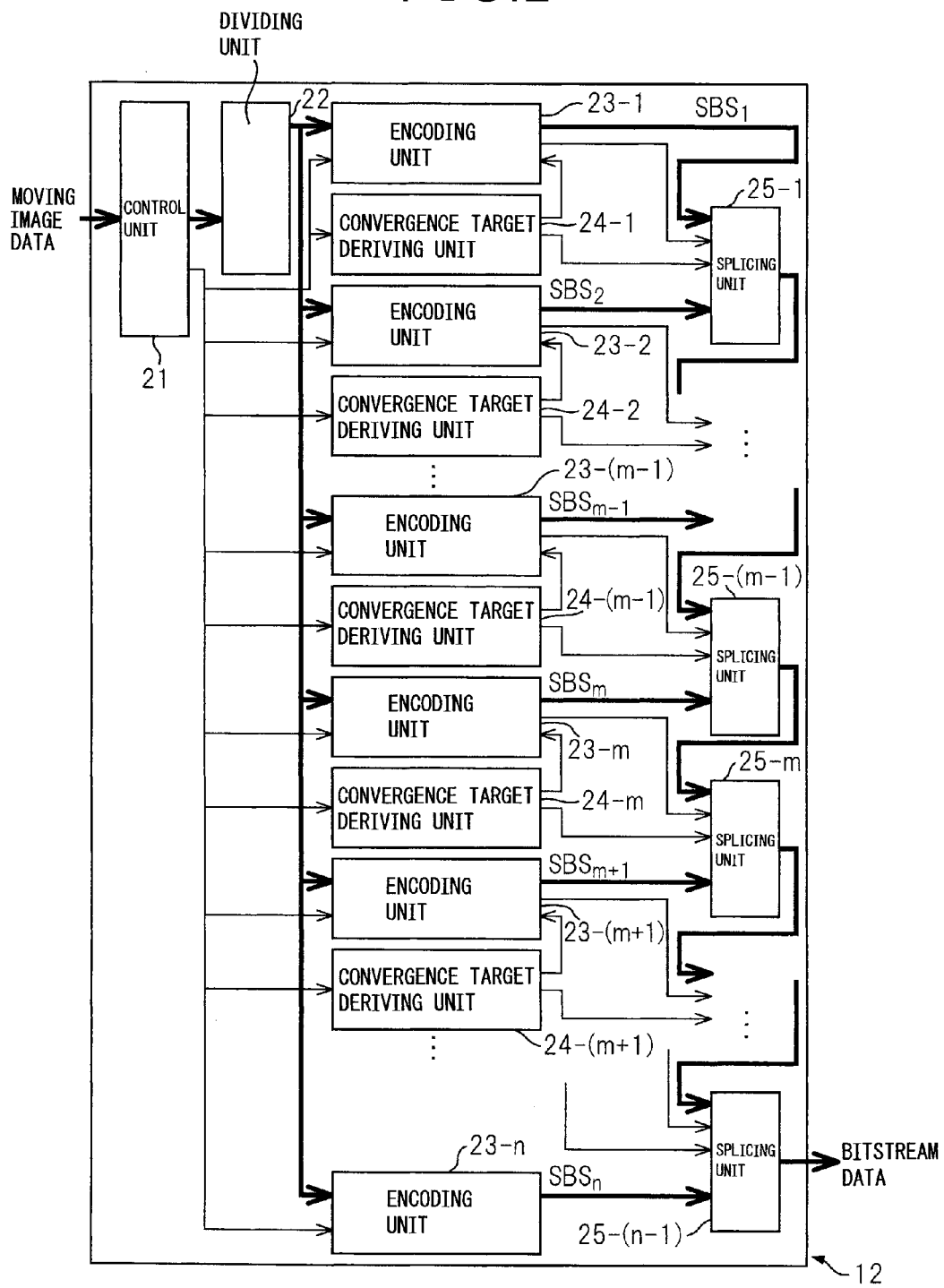
FIG. 2 is a functional block diagram of a processing unit in the moving image encoding apparatus, illustrating the functions implemented therein in order to encode moving image data.

FIG. 2 is a functional block diagram of the processing unit 12, illustrating the functions implemented therein in order to encode the moving image data. As illustrated in FIG. 2, the processing unit 12 includes a control unit 21, a dividing unit 22, a number, n, of encoding units 23-1, 23-2, . . . , 23-n, a number, (n−1), of convergence target deriving units 24-1, 24-2, . . . , 24-(n−1), and the same number, (n−1), of splicing units 25-1, 25-2, . . . , 25-(n−1). N is an integer not smaller than 2.

These units constituting the processing unit 12 are functional modules implemented by a computer program executed on the processor incorporated in the processing unit 12. These units constituting the processing unit 12 may be mounted in the moving image encoding apparatus 1 as respectively separate operation circuits or as a single integrated circuit on which the respective operation circuits are integrated.

The control unit 21 controls the entire operation of the processing unit 12. For this purpose, the control unit 21 supplies each encoding unit 23-$m$ (where m=1, 2, . . . , n) with a parameter based on which the encoding unit 23-$m$ determines the number of encoding bits to be used to encode the sub-data allocated to that encoding unit. Further, the control unit 21 supplies each convergence target deriving unit 24-$k$ (where k=1, 2, . . . , n−1) with a parameter based on which the convergence target deriving unit 24-$k$ determines a target value for the amount of space that the bitstream data occupies in the standard decoder buffer. These parameters will be described later in connection with the encoding unit 23-$m$ and the convergence target deriving unit 24-$k$, respectively.

Further, the control unit 21 reads the storage unit 11 to retrieve the moving image data to be encoded or acquires the moving image data through the input/output unit 13, and passes the moving image data to the dividing unit 22. If information concerning the content of the moving image data is also acquired along with the moving image data, such information may also be passed to the dividing unit 22. The control unit 21 may acquire a plurality of moving image data from the storage unit 11 or through the input/output unit 13 and pass the plurality of moving image data to the dividing unit 22. Further, the processing unit 12 may acquire moving image data predivided into a plurality of moving image data, encode them using the respective encoding units 23-$m$, and generate single bitstream data by splicing the sub-bitstream data generated by encoding the respective moving image data. In this case, the dividing unit 22 may be omitted. Then, the control unit 21 supplies the plurality of moving image data directly to the respective encoding units 23-$m$.

The dividing unit 22 generates sub-data by dividing the moving image data received from the control unit 21 into the same number, n, of blocks as the number, n, of encoding units 23-$m$ provided in the processing unit 12. For example, the dividing unit 22 generates n sub-data by dividing the moving image data into n equal parts along the time axis. Alternatively, if information concerning the content of the moving image data is received from the control unit 21, the dividing unit 22 may change the time length of each sub-data adaptively in accordance with the information. For example, the dividing unit 22 may divide the moving image data in such a manner that the time taken to encode the data becomes the same for all the sub-data. For this purpose, the dividing unit 22 may refer to the information concerning the content of the moving image data and divide the moving image data, for example, in such a manner as to increase the time length of any sub-data containing many pictures, such as still scenes, that require a relatively short time for encoding. Conversely, the dividing unit 22 may divide the moving image data in such a manner as to reduce the time length of any sub-data containing many pictures, such as scenes with much motion, that require a relatively long time for encoding. Further, the dividing unit 22 may extract data of a prescribed length from a plurality of portions of the moving image data and may take the extracted data as the sub-data to be encoded. Furthermore, when a plurality of moving image data are received from the control unit 21, the dividing unit 22 may generate the sub-data by dividing single moving image data, produced by splicing the plurality of moving image data, by the number, n, of encoding units 23-m.

Further, the dividing unit 22 may adjust the length of each sub-data so that the number of pictures contained in each sub-data becomes equal to a multiple of Group of Pictures (GOP). The GOP is a structure that defines a set of pictures containing a plurality of successive pictures; the GOP also defines for each picture whether the picture is to be intra-coded or inter-coded. Intra-coding is a method for encoding a picture by using only information contained in that picture. On the other hand, inter-coding is a method for encoding a picture by using not only information from itself but also information from the pictures before and after it.

The dividing unit 22 delivers the thus created sub-data to the respective encoding units 23-1, 23-2, ..., 23-n in the order in which the sub-data are intended to be reproduced. Further, the dividing unit 22 notifies each encoding unit of the number of pictures contained in the corresponding sub-data.

The convergence target deriving units 24-1, 24-2, ..., 24-(n−1) each calculate the target value for the amount of occupancy in the standard decoder buffer at the time the last picture contained in the temporally preceding sub-bitstream data constituting the first of the two sub-bitstream data spliced together is decoded. Since the convergence target deriving units 24-1, 24-2, ..., 24-(n−1) are identical in configuration and function, the following description deals with one convergence target deriving unit 24-m ($1 \leq m \leq n-1$) as an example.

Suppose that single bitstream data is generated by splicing two sub-bitstream data and the single bitstream data is transferred into the standard decoder buffer. In this case, it is preferable that, at the time the last picture contained in the temporally preceding sub-bitstream data is decoded, the amount of space that the bitstream data occupies in the standard decoder buffer coincides with the amount of space that the temporally succeeding sub-bitstream data occupies in the standard decoder buffer at that time. If this condition is satisfied, the amount of buffer occupancy does not exceed the maximum allowable value of the standard decoder buffer, nor does it drop below the minimum allowable value of the standard decoder buffer, as long as each sub-bitstream data is generated so as to satisfy the specification of the standard decoder buffer. In the following description, the time at which the last picture contained in the temporally preceding sub-bitstream data constituting the first of the two sub-bitstream data spliced together is decoded will be referred to as the transition time. Further, the time at which the temporally succeeding sub-bitstream data constituting the second of the two sub-bitstream data spliced together begins to be stored in the standard decoder buffer will be referred to as the splicing time.

Figure 3A:
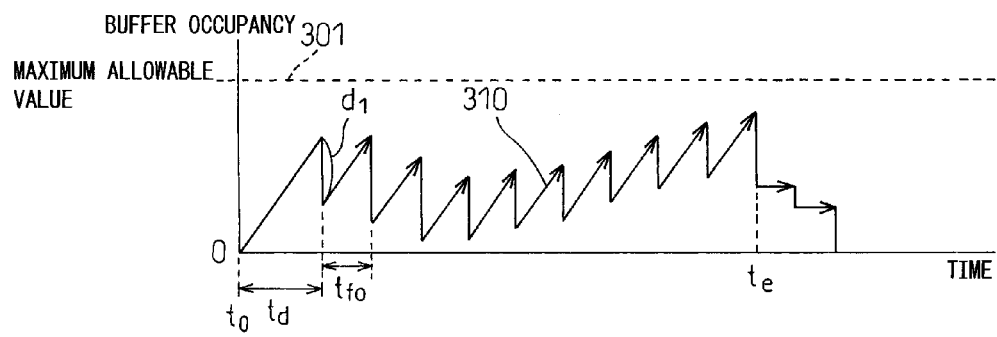
FIG. 3A is a diagram illustrating one example of how the amount of space that one sub-bitstream data occupies in the standard decoder buffer changes over time.
Figure 3B:
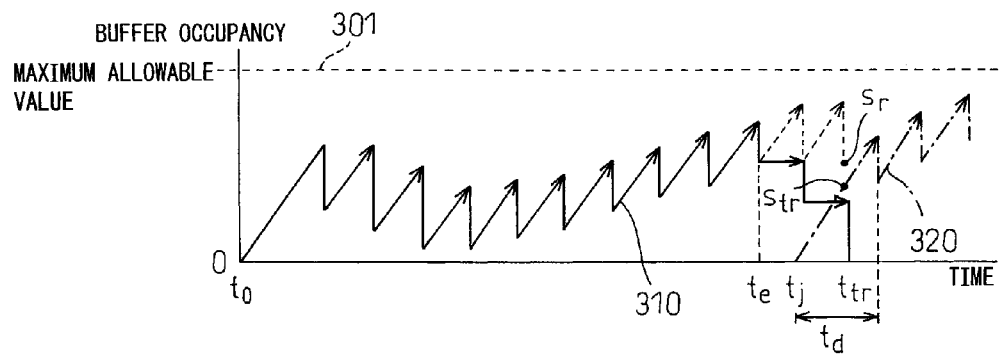
FIG. 3B is a diagram illustrating one example of how the amount of space that each of two sub-bitstream data spliced together occupied in the standard decoder buffer changes over time.
Figure 3C:
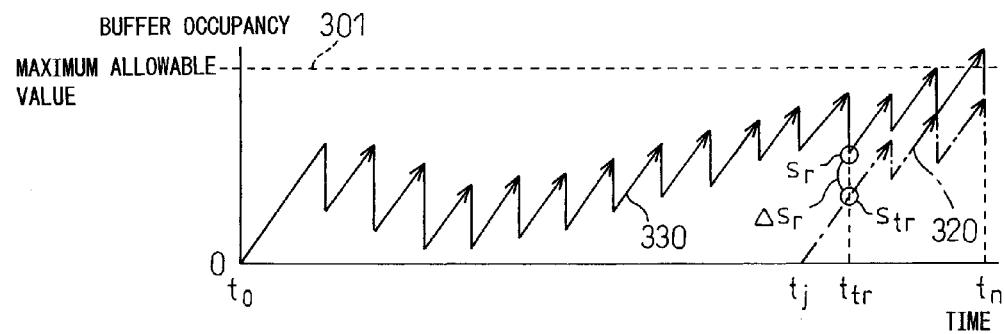
FIG. 3C is a diagram illustrating one example of how the amount of space that the bitstream data produced by splicing the two sub-bitstream data occupies in the standard decoder buffer changes over time.

This will be explained with reference to FIGS. 3A to 3C. FIG. 3A is a diagram illustrating one example of how the amount of space that one sub-bitstream data $SBS_m$ occupies in the standard decoder buffer changes over time. FIG. 3B is a diagram illustrating one example of how the amount of space that each of the two sub-bitstream data $SBS_m$ and $SBS_{m+1}$ spliced together occupies in the standard decoder buffer changes over time. FIG. 3C is a diagram illustrating one example of how the amount of space that the bitstream data BS produced by splicing the two sub-bitstream data $SBS_m$ and $SBS_{m+1}$ occupies in the standard decoder buffer changes over time.

In FIGS. 3A to 3C, the abscissa represents the time, and the ordinate represents the standard decoder buffer occupancy. Line 301 indicates the maximum allowable value of the standard decoder buffer occupancy. Time $t_0$ indicates the time at which the sub-bitstream data $SBS_m$ begins to be stored in the standard decoder buffer. Further, period $t_d$ indicates the initial buffer delay, and period $t_{f0}$ indicates picture spacing which is determined by the frame rate; for example, period $t_{f0}$ is 1/30 seconds. In FIGS. 3A and 3B, graph 310 depicts the change in the amount of space that the sub-bitstream data $SBS_m$ occupies in the standard decoder buffer. In FIGS. 3B and 3C, graph 320 depicts the change in the amount of space that the next sub-bitstream data $SBS_{m+1}$ spliced to the sub-bitstream data $SBS_m$ occupies in the standard decoder buffer. In FIG. 3C, graph 330 depicts the change in the amount of space that the bitstream data BS occupies in the standard decoder buffer. Further, in FIGS. 3B and 3C, time $t_{tr}$ indicates the transition time at which the last picture contained in the temporally preceding sub-bitstream data $SBS_m$ is decoded, and time $t_j$ indicates the splicing time at which the temporally succeeding sub-bitstream data $SBS_{m+1}$ begins to be stored in the standard decoder buffer.

As illustrated in FIG. 3A, from time $t_0$ to the end of the initial buffer delay $t_d$, the amount of space that the sub-bitstream data $SBS_m$ occupies in the standard decoder buffer increases at the maximum transfer bit rate per unit time. Then, when the period of the initial buffer delay $t_d$ has elapsed from time $t_0$, data $d_1$ corresponding to the first picture is removed from the standard decoder buffer. As a result, the amount of buffer occupancy drops by $d_1$. After that, each time the picture spacing $t_{f0}$ elapses, data for one picture is removed from the standard decoder buffer. When the sub-bitstream data $SBS_m$ is being transferred into the standard decoder buffer, the amount of buffer occupancy increases at the maximum transfer bit rate per unit time after data for one picture is removed, until data for the next picture is removed. After time $t_e$ at which the transfer of the sub-bitstream data $SBS_m$ into the standard decoder buffer ends, the amount of buffer occupancy no longer increases, but decreases by an amount equal to one picture each time the picture spacing $t_{f0}$ elapses. Then, when data corresponding to the last picture is removed, the amount of buffer occupancy drops to 0.

As illustrated in FIG. 3B, at the splicing time $t_j$, the sub-bitstream data $SBS_{m+1}$ that follows the sub-bitstream data $SBS_m$ begins to be transferred into the standard decoder buffer. In this case, from the specification of the standard decoder buffer, it is assumed that the transfer of the bitstream data BS into the standard decoder buffer is continuing beyond time $t_e$. As a result, it is assumed that even after $t_e$, the amount of space that the bitstream data BS occupies in the standard decoder buffer increases at the maximum transfer bit rate per unit time during the period starting from the time one picture is decoded and lasting until the time the next picture is decoded, as indicated by dashed lines. On the other hand, as indicated by the graph 320, the amount of space that the sub-bitstream data $SBS_{m+1}$ occupies in the standard decoder buffer increases at the maximum transfer bit rate per unit time, starting from the splicing time $t_j$ until the period of the initial buffer delay $t_d$ elapses. However, if the data corresponding to the pictures decoded from the sub-bitstream data $SBS_m$ after time $t_e$ is small, the remaining amount of buffer occupancy, $S_r$, of the bitstream data BS at the transition time $t_{tr}$ becomes larger than the amount of space, $S_{tr}$, that the sub-bitstream data $SBS_{m+1}$ occupies in the standard decoder buffer at the transition time.

As a result, as illustrated in FIG. 3C, after the transition time $t_{tr}$, the amount of space that the bitstream data BS occupies in the standard decoder buffer becomes equal to the sum of the amount of space that the sub-bitstream data $SBS_{m+1}$ occupies in the standard decoder buffer and the absolute difference $\Delta S_r$ between the remaining amount of buffer occupancy, $S_r$, and the amount of buffer occupancy at the transition time, $S_{tr}$. On the other hand, there is the possibility that the sub-bitstream data $SBS_{m+1}$ may be generated so that, at a given time $t_n$, the amount of space that the sub-bitstream data $SBS_{m+1}$ occupies in the standard decoder buffer comes close to the maximum allowable value of the standard decoder buffer. When this happens, the amount of space that the bitstream data BS occupies in the standard decoder buffer exceeds the maximum allowable value of the standard decoder buffer, because $\Delta S_r$ is added to the amount of space that the sub-bitstream data $SBS_{m+1}$ occupies in the standard decoder buffer.

Conversely, if the data corresponding to the pictures decoded from the sub-bitstream data $SBS_m$ after time $t_e$ is large, the remaining amount of buffer occupancy, $S_r$, of the bitstream data BS at the transition time $t_{tr}$ becomes smaller than the amount of space, $S_{tr}$, that the sub-bitstream data $SBS_{m+1}$ occupies at the transition time. In this case, after the transition time $t_{tr}$, the amount of space that the bitstream data BS occupies in the standard decoder buffer becomes equal to a value obtained by subtracting the absolute difference $\Delta S_r$ between the remaining amount of buffer occupancy, $S_r$, and the amount of buffer occupancy at the transition time, $S_{tr}$, from the amount of space that the sub-bitstream data $SBS_{m+1}$ occupies in the standard decoder buffer. On the other hand, there is the possibility that the sub-bitstream data $SBS_{m+1}$ may be generated so that, at a given time, the amount of space that the sub-bitstream data $SBS_{m+1}$ occupies in the standard decoder buffer comes close to the minimum allowable value of the standard decoder buffer. When this happens, the amount of space that the bitstream data BS occupies in the standard decoder buffer drops below the minimum allowable value of the standard decoder buffer, because $\Delta S_r$ is subtracted from the amount of space that the sub-bitstream data $SBS_{m+1}$ occupies in the standard decoder buffer.

In view of the above, the convergence target deriving unit 24-$m$ obtains as one target value the amount of space that the sub-bitstream data $SBS_{m+1}$ generated by the encoding unit 23-($m$+1) occupies in the standard decoder buffer at the transition time from the sub-bitstream data $SBS_m$ generated by the encoding unit 23-$m$. Further, the convergence target deriving unit 24-$m$ determines a convergence target value for the remaining amount of space that the bitstream data BS produced by splicing the sub-bitstream data $SBS_m$ and $SBS_{m+1}$ occupies in the standard decoder buffer at the transition time. This convergence target value is chosen to not be smaller than the amount of buffer occupancy at the transition time but not larger than the maximum allowable value of the standard decoder buffer.

To determine the amount of buffer occupancy at the transition time and the convergence target value, the control unit 21 supplies the initial buffer delay, the maximum transfer bit rate, and the inter-frame spacing at the splicing point to the convergence target deriving unit 24-$m$. The inter-frame spacing at the splicing point here refers to the time interval between the transition time and the time that the data corresponding to the first picture in the sub-bitstream data $SBS_{m+1}$ is removed from the standard decoder buffer.

Figure 4:
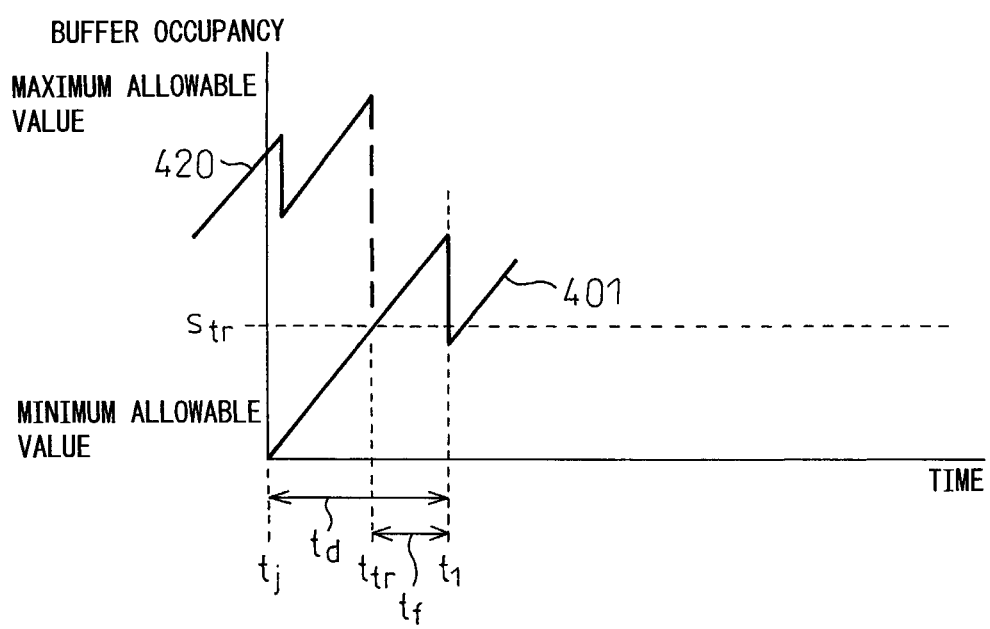
FIG. 4 is a diagram illustrating one example of how the amount of space that, of the two sub-bitstream data spliced together, the temporally succeeding sub-bitstream data occupies in the standard decoder buffer changes in the vicinity of transition time.

FIG. 4 is a diagram illustrating how the amount of space that the sub-bitstream data $SBS_{m+1}$ occupies in the standard decoder buffer changes in the vicinity of the transition time. In FIG. 4, time $t_j$ indicates the splicing time, and time $t_{tr}$ the transition time. Further, time $t_1$ indicates the time at which the data corresponding to the first picture in the sub-bitstream data $SBS_{m+1}$ is removed from the standard decoder buffer. Period $t_d$ indicates the initial buffer delay, and period $t_f$ the inter-frame spacing at the splicing point. Graph 401 depicts the amount of space that the sub-bitstream data $SBS_{m+1}$ occupies in the standard decoder buffer. On the other hand, graph 402 depicts the amount of space that the bitstream data BS produced by splicing the sub-bitstream data $SBS_m$ and $SBS_{m+1}$ occupies in the standard decoder buffer.

From the definition of the standard decoder buffer, the amount of the sub-bitstream data $SBS_{m+1}$ stored during the period from time $t_j$ to time $t_1$ is given by multiplying the initial buffer delay $t_d$ by the maximum transfer bit rate. On the other hand, the amount of the sub-bitstream data $SBS_{m+1}$ stored during the period from time $t_{tr}$ to time $t_1$ is given by multiplying the inter-frame spacing at the splicing point, $t_f$, by the maximum transfer bit rate. Accordingly, as illustrated in FIG. 4, the convergence target deriving unit 24-$m$ can calculate the amount of buffer occupancy at the transition time, $S_{tr}$, in accordance with the following equation.

$$S_{tr} = br \times (t_d - t_{tr}) \quad (1)$$

where $br$ represents the maximum transfer bit rate.

When the amount of buffer occupancy at the transition time, $S_{tr}$, is calculated as described above, the convergence target deriving unit 24-$m$ calculates the convergence target value by adding a prescribed bias to the amount of buffer occupancy at the transition time, $S_{tr}$. The prescribed bias has a value of 0 or a positive value. The prescribed bias is chosen so that the amount of space that the bitstream data BS occupies in the standard decoder buffer after the data corresponding to the last picture in the sub-bitstream data $SBS_m$ has been removed at the transition time $t_{tr}$, does not drop below the amount of buffer occupancy at the transition time, $S_{tr}$. Further, the prescribed bias is chosen so that the amount of space that the bitstream data BS occupies in the standard decoder buffer before the data corresponding to the last picture in the sub-bitstream data $SBS_m$ is removed at the transition time $t_{tr}$, does not exceed the maximum allowable value of the standard decoder buffer. For this purpose, the prescribed bias may be chosen to have a value, for example, equal to three times the standard deviation of the variation from the allocated number of encoding bits of the number of encoded bits obtained by encoding one picture or one GOP.

The convergence target deriving unit 24-$m$ passes the value representing the amount of buffer occupancy at the transition time to the splicing unit 25-$m$. Further, the convergence target deriving unit 24-$m$ passes the convergence target value to the encoding unit 23-$m$.

The encoding units 23-1, 23-2, . . . , 23-$n$ generate the sub-bitstream data $SBS_1$, $SBS_2$, . . . , $SBS_n$, respectively, by encoding the input sub-data. Since the encoding units 23-1, 23-2, . . . , 23-$n$ are identical in configuration and function, the following description deals with one encoding unit 23-$m$ as an example.

Figure 5:
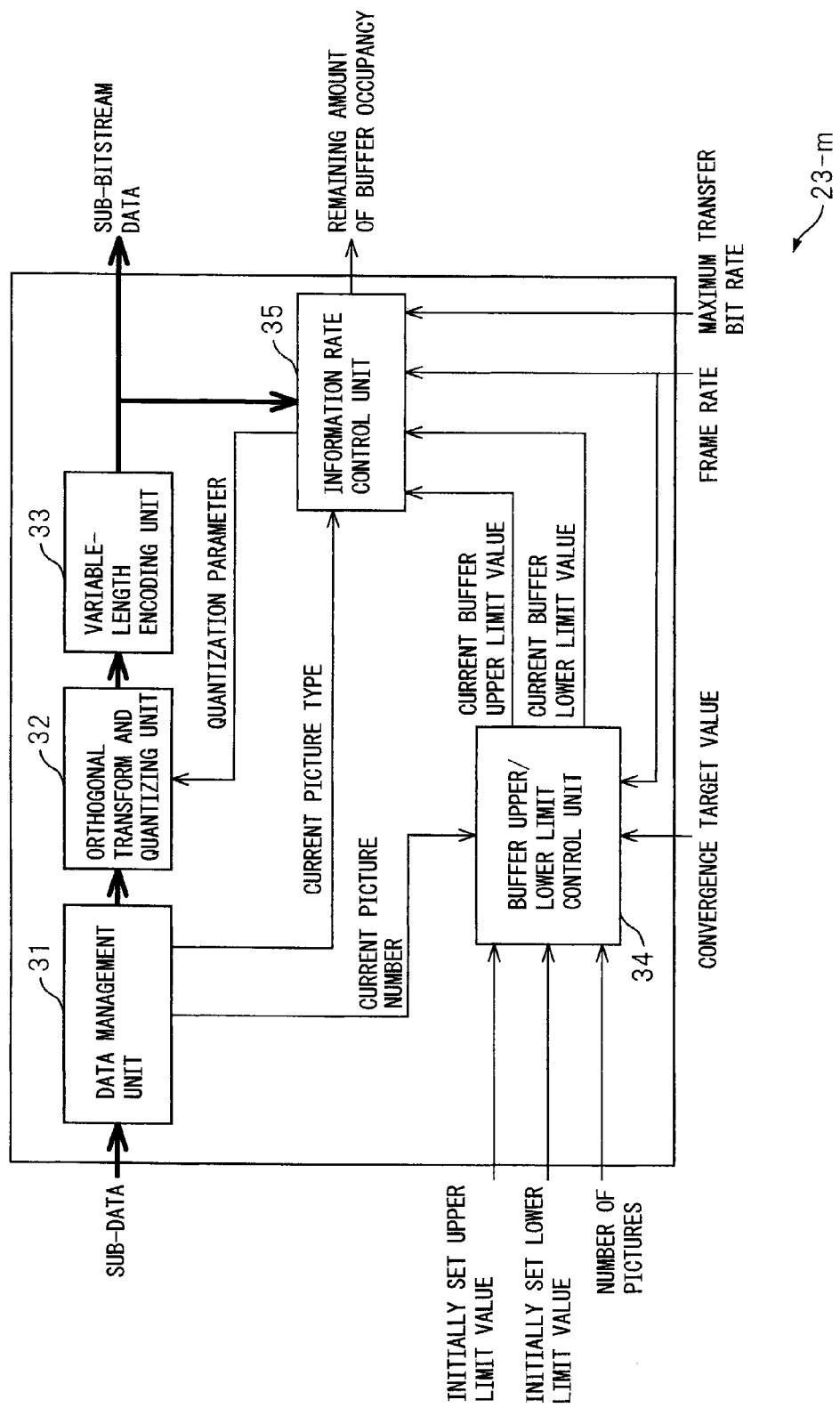
FIG. 5 is a functional block diagram of an encoding unit.

FIG. 5 is a functional block diagram of the encoding unit 23-$m$. As illustrated in FIG. 5, the encoding unit 23-$m$ includes a data management unit 31, an orthogonal transform and quantizing unit 32, a variable-length encoding unit 33, a buffer upper/lower limit control unit 34, and an information rate control unit 35.

The data management unit 31 receives the sub-data from the dividing unit 22, and passes the pictures one at a time to the orthogonal transform and quantizing unit 32 in the order in which the pictures are to be encoded. The data management unit 31 also supplies the orthogonal transform and quantizing unit 32 with a signal that indicates whether the picture passed to the orthogonal transform and quantizing unit 32 is to be intra-coded or inter-coded.

Further, the data management unit 31 passes the current picture number, i.e., the number representing the current picture to be encoded, to the buffer upper/lower limit control unit 34 in order to determine the upper and lower limit values of the standard decoder buffer occupancy for each picture.

The orthogonal transform and quantizing unit 32 applies an orthogonal transform to each picture received from the data management unit 31, and quantizes a frequency signal obtained as a result of the orthogonal transform. The orthogonal transform and quantizing unit 32 thus generates the quantized signal having a smaller number of bits than that of the original picture. For this purpose, the orthogonal transform and quantizing unit 32 may perform the orthogonal transform and quantization in accordance, for example, with one of various moving image encoding standards, such as MPEG-2, MPEG-4, or H.264 MPEG-4 Advanced Video Coding (H.264 MPEG-4 AVC).

In one example of the orthogonal transform and quantization, the orthogonal transform and quantizing unit 32 first divides the current picture received from the data management unit 31 into a plurality of blocks each made up of a prescribed number of pixels. These blocks are hereinafter called the macroblocks. Each macroblock includes, for example, 16×16 pixels.

The orthogonal transform and quantizing unit 32 calculates the difference between each macroblock and a predicted image. The orthogonal transform and quantizing unit 32 generates a prediction error signal by thus calculating the difference value for each pixel in the macroblock. The orthogonal transform and quantizing unit 32 selects either a predicted image for inter-coding or a predicted image for intra-coding in accordance with the signal indicating whether the current picture received from the data management unit 31 is to be inter-coded or intra-coded. As will be described later, the predicted image for inter-coding is created from already encoded pictures. On the other hand, the predicted image for intra-coding is created from already encoded macroblocks in the current picture.

By applying an orthogonal transform to the prediction error signal of each macroblock, the orthogonal transform and quantizing unit 32 obtains a frequency signal representing the horizontal and vertical frequency components of the prediction error signal. For example, by applying a discrete cosine transform (DCT) as the orthogonal transform to the prediction error signal, the orthogonal transform and quantizing unit 32 obtains a set of DCT coefficients for each macroblock as the frequency signal.

Next, the orthogonal transform and quantizing unit 32 quantizes the frequency signal in accordance with a quantization parameter determined by the information rate control unit 35. The quantization is a process for representing the signal values contained within a given section by one signal value. This given section is referred to as the quantization step size. For example, the orthogonal transform and quantizing unit 32 quantizes the frequency signal by dropping from the frequency signal a predetermined number of low-order bits corresponding to the quantization step size. The quantization step size is determined based on the quantization parameter. For example, the orthogonal transform and quantizing unit 32 determines the quantization step size to be used, in accordance with a function that expresses the quantization step size as a function of the value of the quantization parameter. A function monotonically increasing with the value of the quantization parameter may be used as the above function which is preset. Alternatively, a plurality of quantization matrices for defining the quantization step sizes for the horizontal and vertical frequency components are constructed in advance and stored in the storage unit 11. Then, in accordance with the quantization parameter, the orthogonal transform and quantizing unit 32 selects a particular quantization matrix from among the quantization matrices stored in the storage unit 11. The orthogonal transform and quantizing unit 32 then determines the quantization step size for each frequency component of the frequency signal by referring to the selected quantization matrix. Further, in this case, the orthogonal transform and quantizing unit 32 selects the quantization matrix that provides a larger quantization step size for each frequency component as the value of the quantization parameter increases.

The orthogonal transform and quantizing unit 32 can reduce the amount of information contained in each macroblock, because the number of bits used to represent each frequency component of the frequency signal can be reduced by the quantization. The orthogonal transform and quantizing unit 32 supplies the quantized signal to the variable-length encoding unit 33.

Further, to create a predicted image, the orthogonal transform and quantizing unit 32 inverse-quantizes the quantized signal by multiplying it with the predetermined number corresponding to the quantization step size determined by the quantization parameter. By this inverse quantization, the frequency signal for each macroblock, for example, a set of DCT coefficients, is reconstructed. After that, the orthogonal transform and quantizing unit 32 applies an inverse orthogonal transform to the frequency signal. For example, when DCT is performed in the orthogonal transform unit 22, the orthogonal transform and quantizing unit 32 applies an inverse DCT to the inverse-quantized signal. By thus applying the inverse quantization and inverse orthogonal transform to the quantized signal, the prediction error signal is reconstructed that has information substantially the same as that of the original prediction error signal.

When inter-coding the picture, the orthogonal transform and quantizing unit 32 adds, to the value of each pixel in the motion-compensated predicted image to be described later, the reconstructed prediction error signal corresponding to that pixel. On the other hand, when intra-coding the picture, the orthogonal transform and quantizing unit 32 adds, to the value of each pixel in the predicted image created based on already encoded macroblocks, the reconstructed prediction error signal corresponding to that pixel. By applying the above processing operations to each macroblock, the orthogonal transform and quantizing unit 32 creates the predicted picture for the current picture.

The orthogonal transform and quantizing unit 32 stores the predicted picture as a new reference picture in the memory of the processing unit 12. The orthogonal transform and quantizing unit 32 uses the reference picture to create a predicted image. The orthogonal transform and quantizing unit 32 stores a predetermined number of reference pictures, and when the number of reference pictures exceeds the predetermined number, the reference pictures are discarded in the order in which they were stored.

To create the predicted image for inter-coding, the orthogonal transform and quantizing unit 32 obtains a motion vector by matching each macroblock in the current picture against already encoded reference pictures. The motion vector represents the amount of spatial displacement between the macroblock in the current picture and the block in the reference picture that has the highest similarity to that macroblock. For example, by performing block matching between the attention macroblock in the current picture and each of the reference pictures, the orthogonal transform and quantizing unit 32 determines from among the reference pictures the reference picture, as well as the area in that reference picture, that best matches the macroblock. Then, the orthogonal transform and quantizing unit 32 generates the motion vector that has as its elements the position of the macroblock in the current picture, the amounts of horizontal and vertical displacements from the area that best matches the macroblock, and identification information indicating the reference picture to which that area belongs.

The orthogonal transform and quantizing unit 32 obtains the motion vector for each macroblock contained in the current picture. Then, by performing motion compensation on the reference picture by using the thus obtained motion vectors, the orthogonal transform and quantizing unit 32 creates a block-by-block motion-compensated predicted image. Motion compensation is the process in which the position of the block in the reference picture that has the highest similarity to the macroblock represented by each motion vector is moved so as to offset the amount of displacement between that macroblock and the block in the reference picture that has the highest similarity.

Further, for the attention macroblock in the current picture, the orthogonal transform and quantizing unit 32 creates the predicted image for intra-coding by interpolation from the values of the pixels contained in the already encoded macroblock adjacent on the upper or left side of that attention macroblock.

By encoding the quantized signal and motion vector received from the orthogonal transform and quantizing unit 32, the variable-length encoding unit 33 generates a set of bits whose amount of data has been reduced compared with that of the original picture. Then, the variable-length encoding unit 33 generates sub-bitstream data corresponding to the sub-data input to the encoding unit 23-$m$, by concatenating the sets of bits generated for the respective pictures contained in the sub-data in accordance with the order in which they are encoded. For this purpose, the variable-length encoding unit 33, for example, applies variable-length coding to the quantized signal, in which signal values are each represented by a variable-length codeword whose length becomes shorter as the probability of occurrence of the signal value becomes higher. For example, the variable-length encoding unit 33 can perform Huffman coding or arithmetic coding as the variable-length coding.

The variable-length encoding unit 33 supplies the generated sub-bitstream data to the splicing unit 25-$m$. Further, the variable-length encoding unit 33 notifies the information rate control unit 35 of the encoding bit length actually allocated to each picture, each macroblock, or each GOP contained in the generated sub-bitstream data.

The buffer upper/lower limit control unit 34 determines the limit values for the amount of space that the bitstream data occupies in the standard decoder buffer. More specifically, the buffer upper/lower limit control unit 34 determines the lower limit value for the amount of space that the bitstream data occupies in the standard decoder buffer at the time the encoded data corresponding to the current picture to be encoded is removed from the standard decoder buffer. Further, the buffer upper/lower limit control unit 34 determines the upper limit value for the amount of space that the bitstream data occupies in the standard decoder buffer at the time the encoded data corresponding to the current picture to be encoded is stored into the standard decoder buffer.

For the upper and lower limit values to be determined, the control unit 21 notifies the buffer upper/lower limit control unit 34 of the upper and lower limit values initially set for the standard decoder buffer and the number of pictures contained in the sub-data supplied to the encoding unit 23-$m$. On the other hand, the data management unit 31 notifies the buffer upper/lower limit control unit 34 of the number of the current picture to be encoded. Further, the convergence target deriving unit 24-$m$ notifies the buffer upper/lower limit control unit 34 of the convergence target value at the transition time at which the last picture contained in the sub-bitstream data generated by the encoding unit 23-$m$ is decoded.

The buffer upper/lower limit control unit 34 sets the lower limit value for the amount of space that the bitstream data BS produced by splicing the sub-bitstream data $SBS_m$ and $SBS_{m+1}$ generated by the respective encoding units 23-$m$ and 23-($m$+1) occupies in the standard decoder buffer. More specifically, the buffer upper/lower limit control unit 34 determines the lower limit value in such a manner that the amount of space that the bitstream data BS occupies in the standard decoder buffer at the transition time from the sub-bitstream data $SBS_m$ to the sub-bitstream data $SBS_{m+1}$ does not drop below the convergence target value.

Furthermore, the buffer upper/lower limit control unit 34 sets the lower limit value for the amount of space that the bitstream data BS occupies at the time each picture in the sub-bitstream data $SBS_m$ is removed from the standard decoder buffer, in such a manner that the number of encoding bits allocated to each picture does not vary abruptly.

For example, during the period of time that elapses from the time the sub-bitstream data $SBS_m$ begins to be stored into the standard decoder buffer until the time a predetermined control start time is reached, the buffer upper/lower limit control unit 34 holds the lower limit value to the lower limit value initially set by the control unit 21. The elapsed time t is calculated by the following equation.

$$t=(n_p-1)\times fr+t_d \qquad (2)$$

Here, $n_p$ indicates the number of the current picture to be encoded, which is acquired from the data management unit 31. On the other hand, $f_r$ indicates the number of pictures, contained in the sub-data, that are removed from the standard decoder buffer per second. Further, $t_d$ indicates the initial buffer delay, i.e., the delay from the time the sub-bitstream data $SBS_m$ begins to be stored into the standard decoder buffer, until the data corresponding to the first picture is removed.

On the other hand, after the elapsed time t has reached the control start time, the buffer upper/lower limit control unit 34 causes the lower limit value to monotonically increase in such a manner that the lower limit value approaches the convergence target value as the elapsed time t increases. The control start time is set to a value not smaller than 0 but smaller than a predetermined control end time. However, if the control start time were set so that the lower limit value would be adjusted only for a small number of pictures near the end of the sub-data, the number of bits allocable to these pictures would become very small, resulting in a significant degradation of the decoded image quality of these pictures. It is therefore preferable to set the control start time so that the picture quality degradation caused by the reduction in the number of encoding bits with the increase of the lower limit value for each picture is suppressed to a level that is not noticeable to the observer. For example, the control start time is set to a time that is not later than the time corresponding to one half of the number of pictures contained in the sub-data. On the other hand, the control end time can be set to a time that is earlier than the transition time from the sub-bitstream data $SBS_m$ to the sub-bitstream data $SBS_{m+1}$ but is later than the control end time. However, it is preferable to set the interval between the control start time and the control end time as long as possible. By setting the control end time in this way, the buffer upper/lower limit control unit 34 can bring the lower limit value of the standard decoder buffer occupancy close to the convergence target value without drastically reducing the number of encoding bits to be allocated to each picture.

The buffer upper/lower limit control unit 34 can set the lower limit value $L_{np}$ for the current picture in accordance, for example, with the following equation.

$$L_{np} = L_{ini} \quad (t_p \leq t_{start}) \quad (3)$$

$$L_{np} = \alpha(t_p - t_{start})$$

$$\alpha = \frac{S_{target} - L_{ini}}{t_{end} - t_{start}}(t_{start} < t_p < t_{end})$$

$$L_{np} = S_{target} \quad (t_{end} \leq t_p)$$

Here, $t_p$ indicates the time corresponding to the current picture. On the other hand, $t_{start}$ denotes the control start time at which the lower limit value begins to be adjusted, while $t_{end}$ denotes the time at which the adjustment of the lower limit value ends. Further, $S_{target}$ represents the convergence target value, and $L_{ini}$ the initially set lower limit value.

There may be cases where the upper limit value initially set by the control unit 21 for the standard decoder buffer is lower than the convergence target value. In such cases, the encoding unit 23-$m$ is not allowed to determine the number of encoding bits to be allocated to each picture in such a manner as to exceed the initially set upper limit value. As a result, the encoding unit 23-$m$ is unable to bring close to the convergence target value the remaining amount of buffer space that the bitstream data BS occupies at the time the data corresponding to the last picture contained in the sub-bitstream data $SBS_m$ is removed from the standard decoder buffer. Accordingly, in such cases, the buffer upper/lower limit control unit 34 corrects the upper limit value so that it becomes higher than the convergence target value. For example, the buffer upper/lower limit control unit 34 sets the upper limit value for all the pictures to a value equal to the maximum allowable value of the standard decoder buffer occupancy. Alternatively, the buffer upper/lower limit control unit 34 may set the upper limit value in such a manner that the upper limit value at the time a picture is removed from the standard decoder buffer is gradually increased over a period of time after the predetermined control start time but before the control end time, until the upper limit value becomes higher than the convergence target value. The control start time for the upper limit value need not necessarily be the same as the control start time for the lower limit value. Likewise, the control end time for the upper limit value need not necessarily be the same as the control end time for the lower limit value. However, it is preferable to set the upper and lower limit values so that a difference corresponding to the number of encoding bits at least for one picture is always provided between the upper limit value and the lower limit value.

FIG. 6A is a graph illustrating one example of how the lower limit value of the standard decoder buffer, which is set by the buffer upper/lower limit control unit 34, changes over time. FIG. 6B is a graph illustrating one example of how the upper limit value of the standard decoder buffer, which is set by the buffer upper/lower limit control unit 34, changes over time.

In FIGS. 6A and 6B, the abscissa represents the time, and the ordinate represents the standard decoder buffer occupancy. In FIG. 6A, line 601 indicates the upper limit value of the standard decoder buffer occupancy, while line 602 indicates the lower limit value of the standard decoder buffer occupancy. Further, lines 603 and 604 indicate the convergence target value and the buffer occupancy at the transition time, respectively. Graph 605 depicts the change in the amount of space that the bitstream data BS, produced by splicing the sub-bitstream data $SBS_m$ generated by the encoding unit 23-$m$ and the next sub-bitstream data $SBS_{m+1}$ generated by the encoding unit 23-($m$+1), occupies in the standard decoder buffer.

As illustrated in FIG. 6A, the lower limit value 602 of the standard decoder buffer occupancy is set and held at the initially set lower limit value during the period from time $t_0$, at which the sub-bitstream data $SBS_m$ begins to be stored into the standard decoder buffer, to the control start time $t_1$. After that, the lower limit value 602 linearly increases during the period from the control start time $t_1$ to the control end time $t_2$. Then, at the control end time $t_2$, the lower limit value 602 reaches the convergence target value 603 which is set higher than the buffer occupancy at the transition time, 604, and after time $t_2$, the lower limit value 602 is held constant. By setting the lower limit value in this way, the amount of space that the bitstream data BS occupies in the standard decoder buffer at the transition time $t_r$, at which the last picture in the sub-bitstream data $SBS_m$ is decoded becomes reliably higher than the amount of buffer space that the sub-bitstream data $SBS_{m+1}$ occupies at the transition time. On the other hand, in this example, since the upper limit value 601 of the standard decoder buffer occupancy is set sufficiently high so that the buffer occupancy 605 does not exceed the upper limit value 601 even if the lower limit value 602 is set to the convergence target value 603, the buffer upper/lower limit control unit 34 does not correct the upper limit value.

In FIG. 6B, line 611 indicates the upper limit value of the standard decoder buffer occupancy, while line 612 indicates the lower limit value of the standard decoder buffer occupancy. Further, line 613 indicates the convergence target value.

As illustrated in FIG. 6B, the lower limit value 612 of the standard decoder buffer occupancy is set and held at the initially set lower limit value during the period from time $t_0$, at which the sub-bitstream data begins to be stored into the standard decoder buffer, to the control start time $t_1$. After that, the lower limit value 612 linearly increases during the period from the control start time $t_1$ to the control end time $t_2$. Then, at the control end time $t_2$, the lower limit value 612 reaches the convergence target value 613. On the other hand, the upper limit value 611 of the standard decoder buffer occupancy is set and held at the initially set upper limit value during the period from time $t_0$ to the control start time $t_3$. After that, the upper limit value 611 linearly increases during the period from the control start time $t_3$ to the control end time $t_4$. Then, at the control end time $t_4$, the upper limit value 611 reaches the maximum allowable value of the standard decoder buffer, and is held constant after time $t_4$.

The buffer upper/lower limit control unit 34 notifies the information rate control unit 35 of the upper and lower limit values set for the current picture.

The information rate control unit 35 determines the quantization parameter for controlling the number of encoding bits to be allocated to the picture which is encoded by the orthogonal transform and quantizing unit 32.

The information rate control unit 35 can employ any one of various methods in which the quantization parameter is determined such that the parameter value becomes smaller as the value of the target information rate corresponding to the number of encoding bits to be allocated to the picture becomes larger. The information rate control unit 35 may employ, from among such methods, a feedback method in which the number of encoding bits to be allocated to the next picture is determined from the number of encoding bits actually allocated to the previously encoded picture and the planning of the target number of encoding bits. Alternatively, the information rate control unit 35 may employ a feedforward method in which a statistical quantity representing the nature of the picture is calculated from motion prediction, etc. performed in the orthogonal transform and quantizing unit 32 and, based on that statistical quantity, the number of encoding bits to be allocated to the next picture is determined. Further, the information rate control unit 35 may use the feedback method and the feedforward method in combination.

For example, the information rate control unit 35 obtains the basic target information rate for each picture in accordance with a method employed in MPEG-2 Standard Test Model 5. In this case, the maximum transfer bit rate and the frame rate are input to the information rate control unit 35 from the control unit 21. Further, picture type information indicating whether the current picture to be encoded is a picture to be inter-coded or a picture to be intra-coded is input to the information rate control unit 35 from the data management unit 31. Furthermore, the upper and lower limit values for the current picture are input to the information rate control unit 35 from the buffer upper/lower limit control unit 34. Then, based on the thus input parameters, the information rate control unit 35 determines the basic target information rate so that the amount of occupancy in the standard decoder buffer does not exceed its upper limit value when the encoded bit string corresponding to the current picture is transferred into the standard decoder buffer. Further, based on the thus input parameters, the information rate control unit 35 determines the basic target information rate so that the amount of occupancy in the standard decoder buffer does not drop below its lower limit value when the encoded bit string corresponding to the current picture is removed from the standard decoder buffer.

Further, when the lower limit value of the buffer occupancy is corrected so as to move away from the initially set lower limit value and approach the convergence target value, the information rate control unit 35 determines the correction information rate for each picture so that the amount of occupancy in the standard decoder buffer does not drop below the corrected lower limit value. Then, the information rate control unit 35 calculates the final target information rate by subtracting the corrected target information rate from the basic target information rate. The information rate control unit 35 then obtains the quantization parameter that matches the value of the target information rate. For the basic target information rate and quantization parameter calculation methods defined in MPEG-2 Standard Test Model 5, refer to the URL designated by http://www.mpeg.org/MPEG/MSSG/tm5/Ch10/Ch10.html. The information rate control unit 35 may determine the quantization parameter by using a rate distortion function, such as disclosed in Japanese Unexamined Patent Publication No. 2008-252562, that expresses the relationship between the target information rate and the quantization parameter. In this case also, when the initially set lower limit value of the buffer occupancy is corrected as described above, the information rate control unit 35 corrects the target information rate for each picture by subtracting the corrected target information rate from the target information rate.

As an example, the information rate control unit 35 first calculates the degree of complexity estimated for the current picture. The degrees of complexity for a picture to be intra-coded, a picture to be inter-coded by predicting in only one direction, and a picture to be inter-coded by predicting in both directions are respectively calculated by the following equations. In the following description, an intra-coded picture is called the I picture. On the other hand, a picture inter-coded using temporally preceding picture information is called the P picture. Further, a picture inter-coded using both temporally preceding and succeeding picture information is called the B picture.

$$X_i = S_i Q_i$$

$$X_p = S_p Q_p$$

$$X_b = S_b Q_b \quad (4)$$

Here, $X_i$ is the degree of compression for the I picture, and $X_p$ the degree of compression for the P picture. $X_b$ is the degree of compression for the B picture. $S_i$ indicates the number of bits generated by encoding the immediately preceding picture when the immediately preceding encoded picture is an I picture. Likewise, $S_p$ indicates the number of bits generated by encoding the immediately preceding picture when the immediately preceding encoded picture is a P picture. Further, $S_p$ indicates the number of bits generated by encoding the immediately preceding picture when the immediately preceding encoded picture is a B picture. On the other hand, $Q_i$, $Q_p$, and $Q_b$ are each an average quantization parameter computed by averaging all the macroblock quantization parameters used for encoding the previous picture when the previous picture is an I picture, a P picture, or a B picture, respectively. The initial values of $X_i$, $X_p$, and $X_b$ are set, for example, as follows:

$$X_i = (160 * \text{bitrate})/115$$

$$X_p = (60 * \text{bitrate})/115$$

$$X_b = (42 * \text{bitrate})/115$$

where bitrate is the maximum transfer bit rate and represents the information rate per second (bits/s) for encoding.

Next, based on the degrees of complexity, $X_i$, $X_p$, and $X_b$, thus calculated, the information rate control unit 35 calculates the basic target information rate $T_i$ for the I picture, the basic target information rate $T_p$ for the P picture, and the basic target information rate $T_b$ for the B picture in accordance with the following equations.

$$T_i = \max\left\{ \frac{R}{\left(1 + \frac{N_p X_p}{X_i K_p} + \frac{N_b X_b}{X_i K_b}\right)}, \frac{\text{bitrate}}{8 \times \text{picturerate}} \right\} \quad (5)$$

$$T_p = \max\left\{ \frac{R}{\left(N_p + \frac{N_b K_p X_b}{K_b X_p}\right)}, \frac{\text{bitrate}}{8 \times \text{picturerate}} \right\}$$

$$T_b = \max\left\{ \frac{R}{\left(N_b + \frac{N_p K_b X_p}{K_p X_b}\right)}, \frac{\text{bitrate}}{8 \times \text{picturerate}} \right\}$$

Here, $K_p$ and $K_b$ are constants; generally, $K_p=1.0$ and $K_b=1.4$. Further, R indicates the remaining number of encoding bits allocable to the GOP. After encoding each picture, R is updated as follows:

$$R = R - Sj$$

Here, Sj=Si if the immediately preceding picture is an I picture. Sj=Sp if the immediately preceding picture is a P picture. Or, Sj=Sb if the immediately preceding picture is a B picture.

When encoding the first picture in the GOP, i.e., an I picture, the remaining number R of bits is updated as follows by using the remaining number R of bits calculated for the preceding GOP.

$$R = G + R$$

$$G = \text{bitrate} * N / \text{picturerate}$$

where N is the number of pictures contained in the GOP. For the first GOP in the moving image data, R is set to 0. On the other hand, picturerate is the number of pictures scanned per second (Hz) in the moving image data to be encoded.

Further, in equations (5), $N_p$ and $N_b$ each indicate the number of yet-to-be-encoded P pictures or B pictures, respectively, remaining in the GOP in the encoding order. The function max(a,b) is a function that outputs the value of variable a or b, whichever is larger.

To prevent the amount of occupancy in the standard decoder buffer from dropping below its lower limit value, the information rate control unit 35, using the correction information rate ΔT, adjusts the target information rate for each picture that is encoded after the control start time for the lower limit value of the standard decoder buffer occupancy. More specifically, when the current picture is a picture that is encoded after the control start time, the information rate control unit 35 calculates the correction information rate ΔT. Then, if the current picture is an I picture, the information rate control unit 35 calculates the target information rate T for the current picture by subtracting the correction information rate ΔT from the basic target information rate $T_i$ calculated by equation (5). On the other hand, if the current picture is a P picture, the information rate control unit 35 calculates the target information rate T for the current picture by subtracting the correction information rate ΔT from the basic target information rate $T_p$. If the current picture is a B picture, the information rate control unit 35 calculates the target information rate T for the current picture by subtracting the correction information rate ΔT from the basic target information rate $T_b$.

It is preferable to set the correction information rate ΔT to a value corresponding to the difference between the lower limit value at the time the picture encoded one picture back is removed from the standard decoder buffer and the lower limit value at the time the current picture is removed from the standard decoder buffer. For example, when the lower limit value is determined in accordance with equation (3), the correction information rate ΔT is calculated by the following equation.

$$\Delta T = \frac{S_{target} - L_{ini}}{N_a} \tag{6}$$

Here, $S_{target}$ represents the convergence target value calculated by the convergence target deriving unit 24-m, and $L_{ini}$ the initially set lower limit value. Further, $N_a$ indicates the number of pictures to be encoded during the period from the control start time, at which the buffer upper/lower limit control unit 34 starts the adjustment of the lower limit value of the standard decoder buffer occupancy, to the control end time at which the adjustment of the lower limit value ends. The information rate control unit 35 may set the correction information rate ΔT to 0 for the I picture which significantly affects the encoding of other pictures. In this case, to determine the correction information rate ΔT for P and B pictures, $N_a$ in equation (6) is set to designate the total number of P and B pictures to be encoded during the period from the control start time to the control end time.

Next, the information rate control unit 35 determines the quantization parameter based on the target information rate T. For this purpose, the information rate control unit 35 calculates the fullness, $d_{ij}$, $d_{pj}$, $d_{bj}$, of the standard decoder buffer before encoding the j-th macroblock. The fullness $d_{ij}$ corresponds to an I picture, the fullness $d_{pj}$ corresponds to a P picture, and the fullness $d_{bj}$ corresponds to a B picture. The fullnesses, $d_{ij}$, $d_{pj}$, and $d_{bj}$, are calculated in accordance with the following equations.

$$d_{ij} = d_{i0} + B_{j-1} - \left(\frac{T_i \times (j-1)}{MBN}\right) \tag{7}$$

$$d_{pj} = d_{p0} + B_{j-1} - \left(\frac{T_p \times (j-1)}{MBN}\right)$$

$$d_{bj} = d_{b0} + B_{j-1} - \left(\frac{T_b \times (j-1)}{MBN}\right)$$

Here, $B_{j-1}$ represents the number of bits generated by encoding all the macroblocks from the first to the (j−1)th macroblock. MBN indicates the number of macroblocks contained in the picture. Further, $d_{i0}$, $d_{p0}$, and $d_{b0}$ are the initial values of the respective fullnesses. The fullness, $d_{iMBN}$, $d_{pMBN}$, $d_{bMBN}$, obtained for a particular picture when all the macroblocks contained therein have been encoded provides the initial value of the fullness, $d_{i0}$, $d_{p0}$, $d_{b0}$, for the next picture of the same type.

Finally, using the thus obtained fullness, $d_{ij}$, $d_{pj}$, $d_{bj}$, the information rate control unit 35 determines the quantization parameter for the j-th macroblock by using the following equation.

$$Q_j = \left(\frac{d_j \times 31}{r}\right) \tag{8}$$

$$r = 2 \times \frac{\text{bitrate}}{\text{picturerate}}$$

Here, $d_j$ is $d_{ij}$ if the current picture is an I picture, $d_{pj}$ if the current picture is a P picture, and $d_b$ if the current picture is a B picture.

The information rate control unit 35 passes the thus determined quantization parameter to the orthogonal transform and quantizing unit 32. Further, the information rate control unit 35 notifies the splicing unit 25-m of the remaining amount of buffer space occupied by the bitstream data BS, including the sub-bitstream data $SBS_m$, at the transition time, calculated from the actual number of encoding bits for each picture contained in the sub-bitstream data $SBS_m$. To determine the remaining amount of buffer occupancy, the information rate control unit 35 multiplies the length of the period, from the time the sub-bitstream data $SBS_m$ begins to be stored into the standard decoder buffer to the time the last picture in the sub-bitstream data $SBS_m$ is decoded, by the maximum transfer bit rate. Then, by subtracting from the product the total number of encoding bits of all the pictures contained in the sub-bitstream data $SBS_m$, the information rate control unit 35 calculates the remaining amount of buffer occupancy.

The splicing units 25-1, 25-2, ..., 25-(n−1) splice pairs of sub-bitstream data, input to the respective splicing units 25-1, 25-2, ..., 25-(n−1), in the order in which the sub-bitstream data are intended to be reproduced. As illustrated in FIG. 2, the sub-bitstream data $SBS_1$ output from the encoding unit 23-1 and the sub-bitstream data $SBS_2$ output from the encoding unit 23-2 are supplied as inputs to the splicing unit 25-1. The splicing unit 25-1 then splices the sub-bitstream data $SBS_2$ to the end of the sub-bitstream data $SBS_1$. Then, the splicing unit 25-1 outputs single sub-bitstream data produced by the splicing.

Further, the sub-bitstream data output from the splicing unit 25-($m-1$) and the sub-bitstream data $SBS_{m+1}$ output from the encoding unit 23-($m+1$) are supplied as inputs to the splicing unit 25-$m$ (where $2 \le m \le n-1$). The splicing unit 25-$m$ then splices the sub-bitstream data $SBS_{m+1}$ to the end of the sub-bitstream data output from the splicing unit 25-($m-1$). Then, the splicing unit 25-$m$ outputs single sub-bitstream data produced by the splicing. Finally, the splicing unit 25-($n-1$) outputs the bitstream data into which all the sub-bitstream data generated by the respective encoding units have been spliced. The bitstream data is thus produced by encoding the moving image data acquired by the processing unit 12.

Since the splicing units 25-1, 25-2, . . . , and 25-($n-1$) are identical in configuration and function, the following description deals with one splicing unit 25-$m$ as an example.

The splicing unit 25-$m$ calculates the difference $\Delta S_r$ between the remaining amount of buffer occupancy, $S_r$, reported from the information rate control unit 35 in the encoding unit 23-$m$, and the amount of buffer occupancy at the transition time, $S_{tr}$, reported from the convergence target deriving unit 24-$m$. If the difference $\Delta S_r$ is not 0, the splicing unit 25-$m$ inserts an invalid bit string corresponding to the difference $\Delta S_r$ into the gap between the sub-bitstream data output from the splicing unit 25-($m-1$) and the sub-bitstream data $SBS_{m+1}$. When the last picture in the sub-bitstream data $SBS_m$ is decoded, the invalid bit string is extracted from the standard decoder buffer along with the data corresponding to the last picture. The splicing unit 25-$m$ can thus eliminate any disparity that may occur between the amount of occupancy in the standard decoder buffer at the transition time and the amount of buffer occupancy at the transition time, $S_{tr}$. Preferably, the invalid bit string is generated as a bit string that does not affect the quality of the decoded picture. For example, the invalid bit string may be generated as filler data that conforms to the Network Abstraction Layer (NAL) format defined in H.264 MPEG-4 AVC. Alternatively, the invalid bit string may be generated as a stuffing byte defined in MPEG-2.

Figure 7:
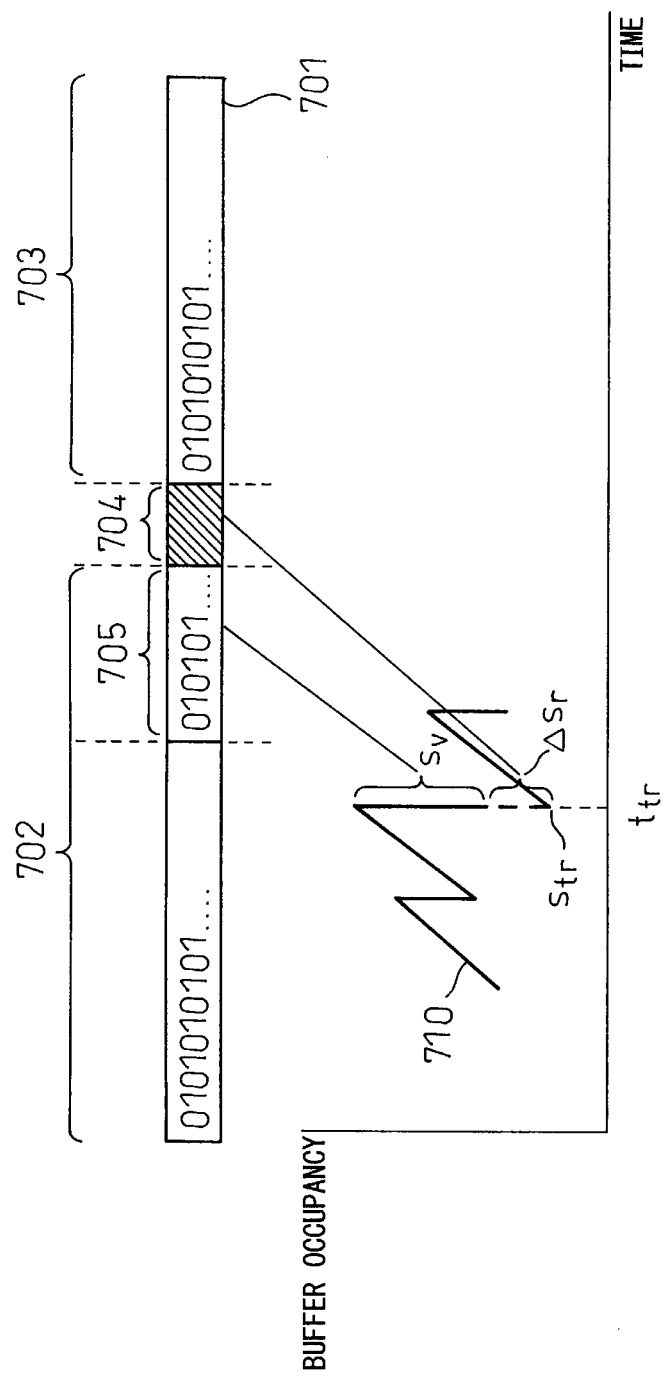
FIG. 7 is a diagram illustrating a correspondence between the change in the amount of space that the bitstream data occupies in the standard decoder buffer at the transition time and the two sub-bitstream data spliced together to produce the bitstream data.

FIG. 7 is a diagram illustrating a correspondence between the change in the amount of space that the bitstream data occupies in the standard decoder buffer at the transition time and the sub-bitstream data spliced together in the splicing unit 25-$m$. A simplified form of the structure of the bitstream data 701 is presented in the upper part of FIG. 7. The lower part of FIG. 7 depicts a graph 710 illustrating how the amount of space that the bitstream data 701 occupies in the standard decoder buffer changes over time. In the graph 710, the abscissa represents the time, and the ordinate represents the buffer occupancy. Time $t_{tr}$ indicates the transition time.

As illustrating in FIG. 7, the bitstream data 701 includes the temporally preceding sub-bitstream data 702 and the temporally succeeding sub-bitstream data 703. The bitstream data 701 further includes an invalid bit string 704 inserted between the two sub-bitstream data. When valid data 705 corresponding to the last picture contained in the temporally preceding sub-bitstream data 702 is removed from the standard decoder buffer, the amount of occupancy in the standard decoder buffer decreases by an amount $S_v$ corresponding to the valid data 705, as depicted by the graph 710. At the transition time $t_{tr}$, since the invalid bit string 704 also is removed from the standard decoder buffer along with the valid data 705, the amount of occupancy in the standard decoder buffer further decreases by an amount $\Delta S_v$ corresponding to the invalid bit string 704. As a result, the amount of buffer occupancy after the valid data 705 corresponding to the last picture contained in the temporally preceding sub-bitstream data 702 has been removed from the standard decoder buffer at the transition time $t_{tr}$ coincides with the amount of buffer space, $S_{tr}$, that the temporally succeeding sub-bitstream data 703 occupies at the transition time.

Figure 8:
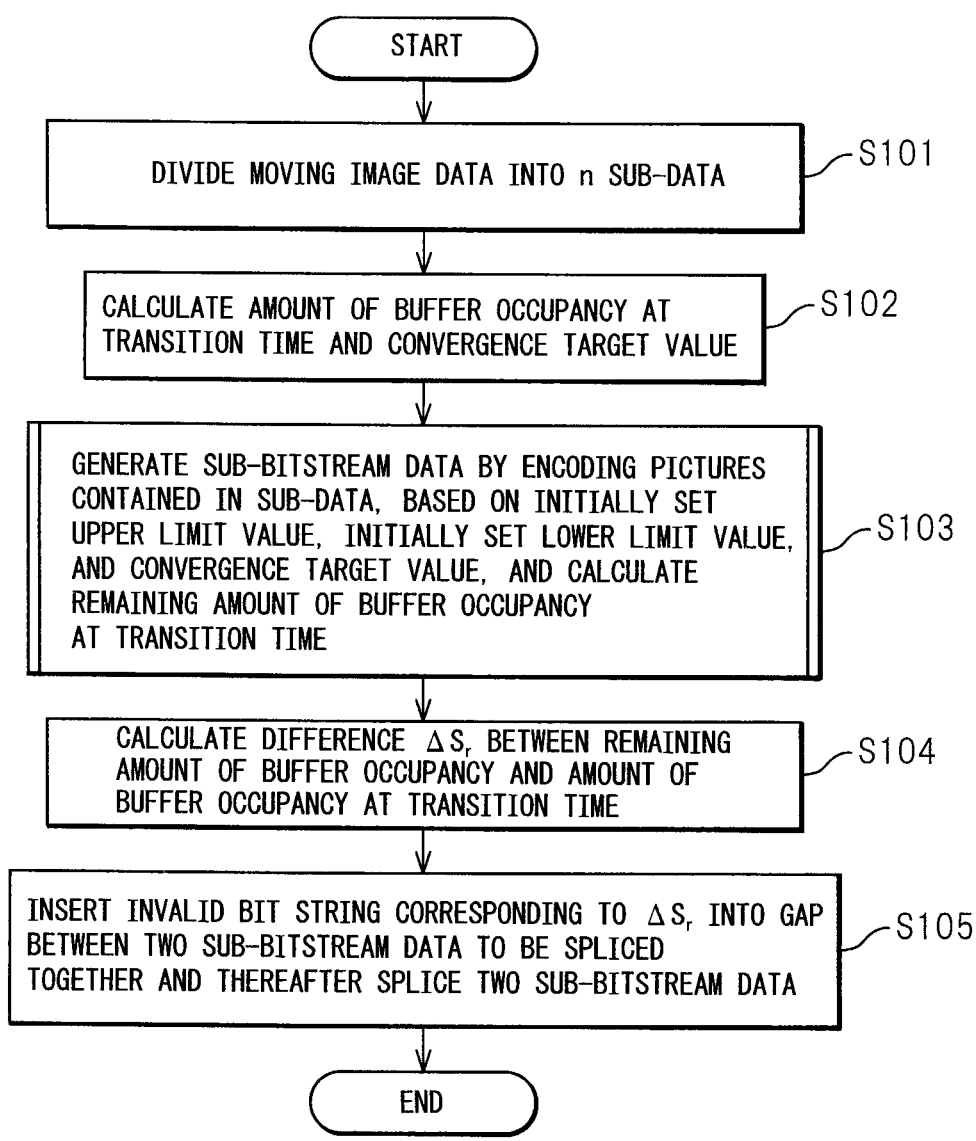
FIG. 8 is an operation flowchart illustrating a moving image data encoding process which is controlled by a computer program executed on the processing unit in the moving image encoding apparatus.

FIG. 8 is an operation flowchart illustrating a moving image data encoding process which is controlled by a computer program executed on the processing unit 12 in the moving image encoding apparatus 1.

As illustrated in FIG. 8, the processing unit 12 starts the encoding process upon acquiring the moving image data to be encoded. The dividing unit 22 in the processing unit 12 divides the moving image data into n sub-data (step S101). Here, n is an integer not smaller than 2, and is equal to the number of encoding units. The dividing unit 22 delivers the sub-data to the respective encoding units 23-$m$ ($1 \le m \le n$) in the order in which the sub-data are intended to be reproduced.

The convergence target deriving unit 24-$k$ ($1 \le k \le n-1$) in the processing unit 12 calculates the amount of buffer occupancy at the transition time, i.e., the time at which a transition is made from the sub-bitstream data $SBS_k$ generated by the encoding unit 23-$k$ to the sub-bitstream data $SBS_{k+1}$ generated by the encoding unit 23-($k+1$), and the convergence target value (step S102). As earlier described, the amount of buffer occupancy at the transition time means the amount of space that the sub-bitstream data $SBS_{k+1}$ occupies in the standard decoder buffer at the transition time. On the other hand, the convergence target value is the target value for the amount of space that the bitstream data BS produced by splicing the sub-bitstream data $SBS_k$ and $SBS_{k+1}$ occupies in the standard decoder buffer at the transition time. The convergence target deriving unit 24-$k$ reports the amount of buffer occupancy at the transition time to the splicing unit 25-$k$. Further, the convergence target deriving unit 24-$k$ reports the convergence target value to the encoding unit 23-$k$ in the processing unit 12.

Based on the thus reported convergence target value or on the upper and lower limits values set for the standard decoder buffer by the control unit 21, each encoding unit 23-$m$ ($1 \le m \le n$) encodes the pictures contained in the input sub-data. The encoding unit 23-$m$ generates sub-bitstream data by thus encoding the pictures contained in the sub-data (step S103). Each encoding unit 23-$k$ ($1 \le k \le n-1$) generates the sub-bitstream data $SBS_k$ so that the amount of space, $S_r$, that the bitstream data BS produced by splicing the sub-bitstream data $SBS_k$ and $SBS_{k+1}$ occupies in the standard decoder buffer at the transition time approaches the convergence target value. On the other hand, the encoding unit 23-$n$ generates the sub-bitstream data $SBS_n$ so that the amount of space that the sub-bitstream data $SBS_n$ occupies in the standard decoder buffer falls within the limits defined by the maximum and minimum allowable values of the standard decoder buffer. The encoding units 23-1 and 23-2 each supply the generated sub-bitstream data to the splicing unit 25-1. Then, each subsequent encoding unit 23-$m$ ($3 \le m \le n$) supplies the generated sub-bitstream data to the splicing unit 25-($m-1$).

Each splicing unit 25-$k$ ($1 \le k \le n-1$) calculates the difference $\Delta S_r$ between the actual remaining amount of buffer occupancy, $S_r$, reported from the information rate control unit 35 in the encoding unit 23-$k$, and the amount of buffer occupancy at the transition time, $S_{tr}$, reported from the convergence target deriving unit 24-$k$ (step S104). Then, the splicing unit 25-$k$ inserts an invalid bit string corresponding to the difference $\Delta S_r$ into the gap between the sub-bitstream data output from the splicing unit 25-($k$−1) and the sub-bitstream data received from the encoding unit 23-($k$+1). After that, the splicing unit 25-$k$ splices the two sub-bitstream data (step S105).

The splicing units thus splice the sub-bitstream data one after another, completing the generation of the bitstream data representing the moving image data in encoded form. Then, the processing unit 12 terminates the moving image encoding process.

FIG. 9 is an operation flowchart illustrating a sub-data encoding process which each encoding unit 23-$k$ (1≤$k$≤$n$−1) carries out under the control of the computer program executed on the processing unit 12 in the moving image encoding apparatus 1.

As illustrated in FIG. 9, the buffer upper/lower limit control unit 34 in the encoding unit 23-$k$ determines the upper and lower limit values of the standard decoder buffer for each picture in the input sub-data in accordance with the convergence target value received from the convergence target deriving unit 24-$k$ (step S201). In this case, the buffer upper/lower limit control unit 34 determines the lower limit value for each picture in such a manner that the lower limit value comes closer to the convergence target value as the picture is located nearer to the end of the sub-bitstream data generated by encoding the input sub-data. Further, if the upper limit value is lower than the convergence target value, the buffer upper/lower limit control unit 34 corrects the upper limit value for each picture so that the upper limit value becomes higher than the convergence target value. The buffer upper/lower limit control unit 34 supplies the thus determined upper and lower limit values to the information rate control unit 35 in the encoding unit 23-$k$.

The information rate control unit 35 determines the target information rate corresponding to the number of encoding bits to be allocated to each picture (step S202). The information rate control unit 35 imposes the condition that the amount of space that the bitstream data produced by splicing the sub-bitstream data SBS$_k$ generated by the encoding unit 23-$k$ and the sub-bitstream data SBS$_{k+1}$ generated by the encoding unit 23-($k$+1) occupies in the standard decoder buffer fall within the range defined by its upper and lower limit values. Further, for any picture for which the lower limit value is set that is different from the lower limit value set for the picture encoded one picture back, the information rate control unit 35 calculates the correction information rate corresponding to the difference between the lower limit values, and corrects the target information rate by subtracting the correction information rate from the target information rate (step S203). Then, based on the target information rate, the information rate control unit 35 determines the quantization parameter for determining the quantization step size (step S204). The information rate control unit 35 supplies the thus determined quantization parameter to the orthogonal transform and quantizing unit 32 in the encoding unit 23-$k$.

The orthogonal transform and quantizing unit 32 obtains a frequency signal by applying an orthogonal transform to each picture contained in the input sub-data. Then, the orthogonal transform and quantizing unit 32 quantizes the frequency signal with the quantization step size determined in accordance with the quantization parameter supplied from the information rate control unit 35 (step S205). The orthogonal transform and quantizing unit 32 passes the resulting quantized signal to the variable-length encoding unit 33 in the encoding unit 23-$k$. The variable-length encoding unit 33 applies variable-length coding to the quantized signal received from the orthogonal transform and quantizing unit 32 (step S206). By concatenating the encoded bit strings obtained for the respective pictures contained in the sub-data input to the encoding unit, the variable-length encoding unit 33 generates the sub-bitstream data into which the sub-data has been encoded (step S207). Then, the variable-length encoding unit 33 supplies the thus generated sub-bitstream data to the corresponding splicing unit (step S208). Further, the variable-length encoding unit 33 notifies the information rate control unit 35 of the number of encoding bits actually allocated to each picture in the sub-bitstream data (step S209). Then, the encoding unit 23-$k$ terminates the sub-data encoding process.

On the other hand, in the encoding unit 23-$n$, in the above step S201 the buffer upper/lower limit control unit 34 sets the upper and lower limit values of the standard decoder buffer exactly the same as the upper and lower limit values determined by the control unit 21. Further, the above step S203 is skipped. Otherwise, the operation of the encoding unit 23-$n$ is the same as that of any other encoding unit.

The bitstream data generated by the moving image encoding apparatus 1 here may be data that conforms, for example, to MPEG-2, MPEG-4, or H.264 MPEG-4 AVC. Accordingly, the bitstream data generated by the moving image encoding apparatus 1 can be decoded by a conventional moving image decoding apparatus.

As so far described, of the two sub-bitstream data to be spliced together in each splicing unit to generate bitstream data, the number of encoding bits to be allocated to the temporally preceding sub-bitstream data is controlled in the moving image encoding apparatus. By so doing, the moving image encoding apparatus adjusts the amount of space that the bitstream data occupies in the standard decoder buffer at the transition time at which the last picture contained in the temporally preceding sub-bitstream data is decoded. More specifically, the moving image encoding apparatus performs control so that the amount of space that the bitstream data occupies in the standard decoder buffer at the transition time becomes larger than the amount of space that the temporally succeeding sub-bitstream data that has been stored in the standard decoder buffer up to the transition time occupies in the standard decoder. Further, the moving image encoding apparatus inserts, between the temporally preceding sub-bitstream data and the temporally succeeding sub-bitstream data, an invalid bit string that is extracted simultaneously when the last picture in the temporally preceding sub-bitstream data is decoded. In this way, the moving image encoding apparatus can eliminate any difference that may occur between the amount of space that the temporally succeeding sub-bitstream data occupies in the standard decoder buffer and the amount of space that the bitstream data occupies in the standard decoder buffer at the transition time. Accordingly, the moving image encoding apparatus can satisfy the specification of the standard decoder buffer without having to simulate the change in the amount of buffer occupancy or to re-encode the pictures after once decoding the encoded pictures. As a result, the moving image encoding apparatus can encode the moving image data at high speed. Furthermore, since the moving image encoding apparatus gradually corrects the lower limit value for the amount of space that the bitstream data occupies in the standard decoder buffer, the number of encoding bits allocated to each picture does not drop abruptly. Accordingly, the moving image encoding apparatus can prevent the degradation of image quality due to encoding over the entire range of the moving image data.

The present invention is not limited to the above specific embodiment. For example, the moving image encoding apparatus may be one that encodes moving image data by using a variable bit rate. In that case, the amount of space that the bitstream data occupies in the standard decoder buffer need only be maintained so as not to drop the minimum allowable value of the buffer occupancy. Accordingly, each splicing unit need not insert an invalid bit string even when the remaining amount of buffer space occupied by the bitstream data at the transition time is larger than the amount of space that the temporally succeeding sub-bitstream data that has been stored in the standard decoder buffer up to the transition time occupies in the standard decoder.

Further, when the moving image encoding apparatus operates in accordance with a prescribed moving image encoding standard, the invalid bit string to be inserted by each splicing unit may only be allowed to have a length equal to an integral multiple of a byte. On the other hand, the difference between the remaining amount of space that the bitstream data produced by splicing two sub-bitstream data occupies in the standard decoder buffer at the transition time and the amount of space that, of the two sub-bitstream data, the temporally succeeding sub-bitstream data occupies at the transition time, is expressed in bits. As a result, when the difference is not equal to an integral multiple of a byte, if the invalid bit string is inserted, the splicing unit cannot make the remaining amount of buffer occupancy at the transition time exactly the same as the amount of buffer occupancy at the transition time. Due to the error between the remaining amount of occupancy and the amount of buffer occupancy at the transition time, which occurs after the insertion of the invalid bit string, the remaining amount of space that the bitstream data occupies in the standard decoder buffer may not fall within the limits defined by the maximum and minimum allowable values of the standard decoder buffer.

In view of this, it is preferable that the buffer upper/lower limit control unit in each encoding unit sets the lower limit value for the standard decoder buffer at the transition time higher than the convergence target value by a predetermined margin. It is further preferable that the buffer upper/lower limit control unit in each encoding unit sets the upper limit value for the standard decoder buffer lower than the maximum allowable value of the standard decoder buffer by a predetermined margin. The predetermined margin here is an amount corresponding to the above error, and may be set, for example, equal to 8 bits. It is also preferable that each splicing unit obtains the sum of the errors from the immediately preceding splicing unit and determines the length of the invalid bit length so that the absolute value of the value obtained by adding the sum of the errors to the error occurring in the splicing unit always becomes equal to or smaller than the predetermined margin.

The image encoding apparatus is used in various applications. For example, the image encoding apparatus is incorporated, for example, in a moving image data delivery server, a video transmission apparatus, a video telephone system, a computer, or a mobile telephone. For example, when the image encoding apparatus is incorporated in a moving image data delivery server, the moving image data encoded by the image encoding apparatus is converted by its processing unit into data streams conforming to a prescribed communication standard, along with other signals such as audio signals accompanying the moving image data. Then, the moving image data delivery server incorporating the image encoding apparatus delivers the data streams to a moving image decoding apparatus via a communication line.

The computer program for causing a computer to implement the functions of the control unit, dividing unit, encoding units, convergence target deriving units, and splicing units constituting the processing unit of the image encoding apparatus may be provided in the form recorded on a medium readable by the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A moving image encoding apparatus comprising:
a storage unit which stores moving image data which includes at least first sub-data and second sub-data containing a plurality of pictures;
a processing unit which, by encoding said moving image data, generates bitstream data having an amount of data smaller than an amount of data of said moving image data; and
an output unit which outputs said bitstream data,
wherein said processing unit comprises:
a convergence target deriving unit which determines, when said bitstream data is transferred at a transfer rate into a buffer of a decoder and data corresponding to said pictures contained in said bitstream data is sequentially removed from said buffer at intervals of time, a target value in association with an amount of space that remains occupied by said bitstream data in said buffer at a first time a last picture contained in first sub-bitstream data generated by encoding said first sub-data is removed from said buffer, the target value being calculated to be above an amount of space that second sub-bitstream data generated by encoding said second sub-data occupies in said buffer at said first time;
a first encoder which determines a number of encoding bits to be allocated to a picture contained in said first sub-data so that buffer occupancy corresponds with said target value, and generates said first sub-bitstream data by encoding said first sub-data in accordance with said allocated number of encoding bits;
a second encoder which generates said second sub-bitstream data by encoding said second sub-data; and
a splicing unit which generates said bitstream data by splicing said first sub-bitstream data and said second sub-bitstream data, and
wherein said amount of space that second sub-bitstream data occupies is a value obtained by multiplying said transfer rate by a remaining period which is obtained by subtracting a period from said first time until a second time when a first picture contained in said second sub-data is removed from said buffer beginning from a period of storing said second sub-bitstream data to said buffer until said second time.

2. The moving image encoding apparatus according to claim 1, wherein said splicing unit inserts, between said first sub-bitstream data and said second sub-bitstream data, a bit string having a length corresponding to a difference obtained by subtracting said amount of space that second sub-bitstream data occupies from said amount of space that remains occupied by said bitstream data in said buffer at said first time.

3. The moving image encoding apparatus according to claim 2, wherein said bit string is an invalid bit string that, when the last picture contained in said first sub-bitstream data is decoded by said decoder, is extracted from said buffer along with the data corresponding to said last picture, and that does not affect the decoding of said last picture.

4. The moving image encoding apparatus according to claim 1, wherein said first encoder is adapted to:
increase, when data corresponding to a first picture contained in said first sub-bitstream data is removed from said buffer, a lower limit value for the amount of space that said bitstream data occupies in said buffer so that said lower limit value approaches said target value as said first picture is located nearer to a back end of said first sub-bitstream data; and
determine a number of encoding bits to be allocated to said first picture so that, the amount of space that said bitstream data occupies in said buffer does not drop below said lower limit value when said first picture is removed from said buffer.

5. The moving image encoding apparatus according to claim 4, wherein said first encoder is adapted to:
determine whether an upper limit value for the amount of space that said bitstream data occupies in said buffer is lower than said target value when data corresponding to a second picture contained in said first sub-bitstream data is stored into said buffer and, correct said upper limit value so that said upper limit value becomes higher than said target value when said determined upper limit value is lower than said target value.

6. The moving image encoding apparatus according to claim 4, wherein said first encoder is adapted to:
generate a frequency signal by applying an orthogonal transform to a signal corresponding to each pixel in each of said plurality of pictures contained in said first sub-bitstream data, and quantize said frequency signal with a quantization step size that becomes smaller as said allocated number of encoding bits becomes larger; and
generate said first sub-bitstream data by applying variable-length coding to said quantized frequency signal, and
wherein when said lower limit value determined in connection with said first picture contained in said first sub-bitstream data is denoted as a first lower limit value, and the lower limit value determined in connection with a picture encoded one picture before said first picture is denoted as a second lower limit value, said determining of the number of encoding bits to be allocated to said first picture determines said number of encoding bits to be allocated to said first picture by subtracting an amount of correction, which corresponds to a difference between said first lower limit value and said second lower limit value, from a basic number of encoding bits supposed to be allocated to said first picture when said first lower limit value is equal to said second lower limit value.

7. A moving image encoding method to encode moving image data, which includes at least first sub-data and second sub-data containing a plurality of pictures, and thereby generating bitstream data having an amount of data smaller than an amount of data of said moving image data, comprising:
determining, when said bitstream data is transferred at a transfer rate into a buffer in a decoder and data corresponding to said pictures contained in said bitstream data is sequentially removed from said buffer at intervals of time, a target value in association with an amount of space that remains occupied by said bitstream data in said buffer at a first time a last picture contained in first sub-bitstream data generated by encoding said first sub-data is removed from said buffer, said target value being calculated to be above an amount of space that second sub-bitstream data generated by encoding said second sub-data occupies in said buffer at said first time;
determining a number of encoding bits to be allocated to a picture contained in said first sub-data so that buffer occupancy corresponds with said target value, and generating said first sub-bitstream data by encoding said first sub-data in accordance with said allocated number of encoding bits by a first encoder;
generating said second sub-bitstream data by encoding said second sub-data by a second encoder; and
generating said bitstream data by splicing said first sub-bitstream data and said second sub-bitstream data, and
wherein said amount of space that second sub-bitstream data occupies is a value obtained by multiplying said transfer rate by a remaining period which is obtained by subtracting a period from said first time until a second time when a first picture contained in said second sub-data is removed from said buffer beginning from a period of storing said second sub-bitstream data to said buffer until said second time.

8. A non-transitory computer readable recording medium having a moving image encoding computer program causing a computer including a first encoder and a second encoder to encode moving image data, which includes at least first sub-data and second sub-data containing a plurality of pictures, and to thereby generate bitstream data having an amount of data smaller than an amount of data of said moving image data, said computer program comprising instructions causing the computer to execute a process comprising:
determining, when said bitstream data is transferred at a transfer rate into a buffer of a decoder and data corresponding to said pictures contained in said bitstream data is sequentially removed from said buffer at intervals of time, a target value in association with an amount of space that remains occupied by said bitstream data in said buffer at a first time a last picture contained in first sub-bitstream data generated by encoding said first sub-data is removed from said buffer, said target value being calculated to be above an amount of space that second sub-bitstream data generated by encoding said second sub-data occupies in said buffer at said first time;
determining a number of encoding bits to be allocated to a picture contained in said first sub-data so that buffer occupancy corresponds with said target value, and generating said first sub-bitstream data by encoding said first sub-data in accordance with said allocated number of encoding bits by the first encoder;
generating said second sub-bitstream data by encoding said second sub-data by the second encoder; and
generating said bitstream data by splicing said first sub-bitstream data and said second sub-bitstream data, and
wherein said amount of space that second sub-bitstream data occupies is a value obtained by multiplying said transfer rate by a remaining period which is obtained by subtracting a period from said first time until a second time when a first picture contained in said second sub-data is removed from said buffer beginning from a period of storing said second sub-bitstream data to said buffer until said second time.

9. The moving image encoding apparatus according to claim 1, wherein said processing unit comparing an amount of space said bitstream data occupies in said buffer with an amount of space a temporally succeeding sub-bitstream data occupies in said buffer at said first time.

10. The moving image encoding apparatus according to claim 9, wherein said processing unit determines that buffer occupancy of said decoder does not exceed an upper limit value or fall below a lower limit value, based on a comparison of said amount of space said bitstream data occupies with an amount of space a temporally succeeding sub-bitstream data occupies at said first time.

* * * * *